(12) United States Patent
Song et al.

(10) Patent No.: US 11,525,948 B2
(45) Date of Patent: Dec. 13, 2022

(54) OPTICAL SHEET, METHOD OF MANUFACTURING THE SAME, AND DISPLAY APPARATUS HAVING THE SAME

(71) Applicant: Samsung Display Co., Ltd., Yongin-Si (KR)

(72) Inventors: Bokwang Song, Suwon-si (KR); Juhoon Kang, Hwaseong-si (KR); Chung Sock Choi, Seoul (KR); Youn Joon Kim, Seoul (KR); Jung Woo Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 169 days.

(21) Appl. No.: 16/996,250

(22) Filed: Aug. 18, 2020

(65) Prior Publication Data
US 2021/0080624 A1 Mar. 18, 2021

(30) Foreign Application Priority Data
Sep. 18, 2019 (KR) .......................... 10-2019-0114767

(51) Int. Cl.
*G02B 5/04* (2006.01)
*G02B 1/11* (2015.01)
*B60K 35/00* (2006.01)

(52) U.S. Cl.
CPC .............. *G02B 5/045* (2013.01); *B60K 35/00* (2013.01); *G02B 1/11* (2013.01); *B60K 2370/152* (2019.05); *B60K 2370/39* (2019.05)

(58) Field of Classification Search
CPC .. G02B 6/0041; G02B 6/0046; G02B 6/0051; G02B 6/005; G02B 5/04; G02B 5/045;
(Continued)

(56) References Cited

U.S. PATENT DOCUMENTS

| 6,890,634 | B1 * | 5/2005 | Yoon | G02B 5/124 |
| | | | | 428/221 |
| 7,019,801 | B2 | 3/2006 | Ueki et al. | |

(Continued)

FOREIGN PATENT DOCUMENTS

| KR | 2013000540 | * | 1/2013 |
| KR | 20130005409 | * | 1/2013 |

(Continued)

*Primary Examiner* — Sultan Chowdhury
(74) *Attorney, Agent, or Firm* — Cantor Colburn LLP

(57) ABSTRACT

An optical sheet includes a first wedge layer having a first refractive index and including a wedge-shaped prism pattern including an inclined surface having an inclination angle with respect to a plane defined by a first direction and a second direction perpendicular to the first direction and a vertical surface extending in a third direction perpendicular to the first direction and the second direction, a second wedge layer disposed on the first wedge layer and having a second refractive index greater than the first refractive index, and a light blocking pattern disposed between the first wedge layer and the second wedge layer and including a first surface that contacts with the vertical surface and a second surface inclined to have the inclination angle with respect to the plane while contacting with the inclined surface.

20 Claims, 16 Drawing Sheets

(58) Field of Classification Search
CPC ....... G02B 6/0053; F21V 8/00; G02F 1/1335; G02F 2001/133607
See application file for complete search history.

(56) References Cited

U.S. PATENT DOCUMENTS

| | | |
|---|---|---|
| 8,213,082 B2 | 7/2012 | Gaides et al. |
| 2015/0153569 A1* | 6/2015 | Yonekubo ............ G02B 27/144 |
| | | 359/629 |
| 2018/0156955 A1* | 6/2018 | Diao .................... G06F 3/0412 |
| 2019/0285882 A1* | 9/2019 | Arndt .................... B60K 35/00 |

FOREIGN PATENT DOCUMENTS

| | | | |
|---|---|---|---|
| KR | 20130005409 A | * | 1/2013 |
| KR | 101266352 B1 | | 5/2013 |
| KR | 101314486 B1 | | 10/2013 |
| KR | 101343116 B1 | | 12/2013 |
| KR | 1020170099457 A | | 9/2017 |
| KR | 101848196 B1 | | 4/2018 |

* cited by examiner

OPTICAL SHEET, METHOD OF MANUFACTURING THE SAME, AND DISPLAY APPARATUS HAVING THE SAME

This application claims priority to Korean Patent Application No. 10-2019-0114767, filed on Sep. 18, 2019, and all the benefits accruing therefrom under 35 U.S.C. § 119, the content of which in its entirety is herein incorporated by reference.

BACKGROUND

1. Field

Exemplary embodiments relate generally to an optical sheet and a display apparatus including the optical sheet. More particularly, exemplary embodiments of the inventive concept relate to an optical sheet, a method of manufacturing the optical sheet, and a display apparatus including the optical sheet.

2. Description of the Related Art

As the technology improves, a display product having a smaller size, lighter weight, and superior performance has been produced. A conventional cathode ray tube ("CRT") television had been widely used as a display apparatus with many advantages in terms of performance and price. Recently, however, a display apparatus such as a plasma display apparatus, a liquid crystal display apparatus, and an organic light emitting display apparatus, which overcomes weak points of the CRT in terms of miniaturization or portability and has advantages such as miniaturization, light weight and low power consumption, has been spotlighted.

SUMMARY

The display apparatus may include an optical sheet configured to limit a viewing angle. A conventional optical sheet may limit an emission angle by absorbing light having an emission angle equal to or more than a cut-off angle using a louver structure having a high aspect ratio. Thus, there has been a problem of loss of luminance.

Some exemplary embodiments provide an optical sheet that minimizes a loss of luminance and limits an emission angle.

Some exemplary embodiments provide a manufacturing the optical sheet.

Some exemplary embodiments provide a display apparatus including the optical sheet.

According to an aspect of exemplary embodiments, an optical sheet includes a first wedge layer having a first refractive index and including a wedge-shaped prism pattern including a first inclined surface having a first inclination angle with respect to a plane defined by a first direction and a second direction perpendicular to the first direction and a first vertical surface extending in a third direction perpendicular to the first direction and the second direction, a second wedge layer disposed on the first wedge layer and having a second refractive index greater than the first refractive index, and a first light blocking pattern disposed between the first wedge layer and the second wedge layer and including a first surface that contacts with the first vertical surface and a second surface inclined to have the first inclination angle with respect to the plane while contacting with the first inclined surface.

In exemplary embodiments, the optical sheet may further include a base film disposed on a lower surface of the first wedge layer or an upper surface of the second wedge layer.

In exemplary embodiments, the second surface of the first light blocking pattern may be a surface closest to the base film among surfaces of the first light blocking pattern.

In exemplary embodiments, the first light blocking pattern may include a first layer parallel to the first vertical surface and including a metal, a second layer parallel to the first layer, spaced apart from the first layer, and including a metal, and a first insulating layer disposed between the first layer and the second layer.

In exemplary embodiments, the first layer may include a first portion which contacts with the first vertical surface and a second portion which extends from the first vertical surface and contacts with the first inclined surface.

In exemplary embodiments, the first layer may have a first thickness, and the second layer may have a second thickness thinner than the first thickness.

In exemplary embodiments, the optical sheet may further include a third layer parallel to the second layer, spaced apart from the second layer, and including a metal and a second insulating layer disposed between the second layer and the third layer. Here, the second layer may be disposed between the first insulating layer and the second insulating layer.

In exemplary embodiments, the first light blocking pattern may include a third surface facing the second surface, and the third surface may be parallel to the plane defined by the first and second directions.

In exemplary embodiments, the prism pattern of the first wedge layer may extend in the first direction, the prism pattern may be provided in plurality, and the plurality of the prism patterns may be arranged in the second direction.

In exemplary embodiments, the optical sheet may further include a third wedge layer disposed on the second wedge layer, having a third refractive index, and including a wedge-shaped prism pattern including a second inclined surface having a second inclination angle inclined in a direction different from the first inclination angle with respect to the plane and a second vertical surface extending in the third direction, a fourth wedge layer disposed on the third wedge layer and having a fourth refractive index greater than the third refractive index, and a second light blocking pattern disposed between the third wedge layer and the fourth wedge layer and including a first surface that contacts with the second vertical surface and a second surface inclined to have the second inclination angle with respect to the plane while contacting with the second inclined surface.

In exemplary embodiments, the prism of the first wedge layer may be provided in plurality, the plurality of prism patterns of the first wedge layer may be arranged in one direction, and a distance between two adjacent first vertical surfaces may be defined as a first pitch of the prism patterns of the first wedge layer. In addition, the prism pattern of the third wedge layer may be provided in plurality, the plurality of prism patterns of the third wedge layer may be arranged in one direction, and a distance between two adjacent second vertical surfaces may be defined as a second pitch of the prism patterns of the third wedge layer. Further, the first pitch of the prism patterns of the first wedge layer and the second pitch of the prism patterns of the third wedge layer may be different from each other.

In exemplary embodiments, the optical sheet may further include an anti-reflection layer disposed on the first inclined surface.

In exemplary embodiments, a square wave pattern may be defined by the first inclined surface.

According to an aspect of exemplary embodiments, a method of manufacturing an optical sheet includes forming a first wedge layer on a base film, where the first wedge layer has a first refractive index and includes a wedge-shaped prism pattern including an inclined surface having an inclination angle with respect to a major surface plane defining the base film and a vertical surface extending in a direction perpendicular to the major surface plane of the base film, forming a light blocking pattern on the vertical surface of the first wedge layer, and forming a second wedge layer having a second refractive index on the first wedge layer on which the light blocking pattern is formed.

In exemplary embodiments, forming the first wedge layer may include forming a resin layer on the base film, forming the prism pattern on the resin layer by using a mold, and curing the resin layer.

In exemplary embodiments, forming the light blocking pattern may include forming a first raw layer including a metal on the first wedge layer, forming a first insulating layer on the first raw layer, forming a second raw layer including a metal on the first insulating layer, and forming a light blocking pattern including a first layer, a first insulating layer, and a second layer by etching the second raw layer, the first raw insulating layer, and the first raw layer by using an anisotropic etching process.

In exemplary embodiments, a thickness of the first layer may be different from a thickness of the second layer.

According to an aspect of exemplary embodiments, a display apparatus includes a display panel which displays an image and an optical sheet disposed on the display panel to limit a light emission angle of the display panel. Here, the optical sheet includes a first wedge layer having a first refractive index and including a wedge-shaped prism pattern including an inclined surface having an inclination angle with respect to a major surface plane defining the display panel and a vertical surface extending in a direction perpendicular to the major surface plane of the display panel, a second wedge layer disposed on the first wedge layer and having a second refractive index greater than the first refractive index, and a light blocking pattern disposed between the first wedge layer and the second wedge layer and including a first surface that contacts with the vertical surface and a second surface inclined to have the inclination angle with respect to the major surface plane of the display panel while contacting with the inclined surface.

In exemplary embodiments, the display apparatus may be a display apparatus for a vehicle, and a direction where a light emission angle of the display panel is limited may be an upward direction with respect to a direction perpendicular to the major surface plane of the display panel.

In exemplary embodiments, the direction where the light emission angle is limited may further include left and right directions with respect to the direction perpendicular to the major surface plane of the display panel.

Therefore, an optical sheet according to exemplary embodiments includes a first wedge layer having a first refractive index and including a wedge-shaped prism pattern including an inclined surface having an inclination angle with respect to a plane defined by a first direction and a second direction perpendicular to the first direction and a vertical surface extending in a third direction perpendicular to the first direction and the second direction, a second wedge layer disposed on the first wedge layer and having a second refractive index greater than the first refractive index, and a light blocking pattern disposed between the first wedge layer and the second wedge layer and including a first surface that contacts with the vertical surface and a second surface inclined to have the inclination angle with respect to the plane while contacting with the inclined surface. Thus, a display apparatus capable of limiting a light emitted from the display apparatus at the cut-off angle or more can be obtained by using the optical sheet.

In addition, because the optical sheet has the light blocking pattern disposed on the vertical surface, an aperture ratio of the optical sheet may be high as a whole such that high luminance may be obtained while limiting the light at the cut-off angle or more.

BRIEF DESCRIPTION OF THE DRAWINGS

Illustrative, non-limiting exemplary embodiments will be more clearly understood from the following detailed description in conjunction with the accompanying drawings.

DETAILED DESCRIPTION

Hereinafter, exemplary embodiments of the present inventive concept will be explained in detail with reference to the accompanying drawings. It will be understood that when an element is referred to as being "on" another element, it can be directly on the other element or intervening elements may be present therebetween. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 1:
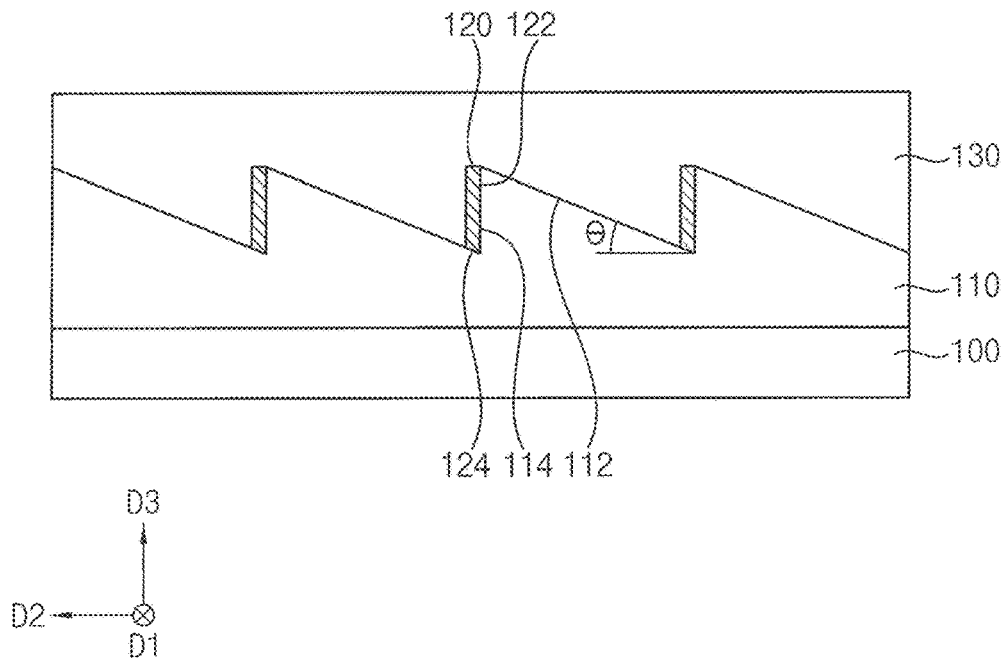
FIG. 1 is a cross-sectional diagram illustrating an optical sheet according to exemplary embodiments.

FIG. 1 is a cross-sectional diagram illustrating an optical sheet according to exemplary embodiments.

Referring to FIG. 1, the optical sheet may include a base film 100, a first wedge layer 110, a second wedge layer 130, and a light blocking pattern 120.

The base film 100 may include a transparent insulating material. For example, the base film 100 may be formed of or include plastic having excellent heat resistance and durability, such as polyimide, polyethylene terephthalate ("PET"), polycarbonate, polyethylene naphtalate, polyarylate ("PAR"), and polyetherimide.

Figure 8:
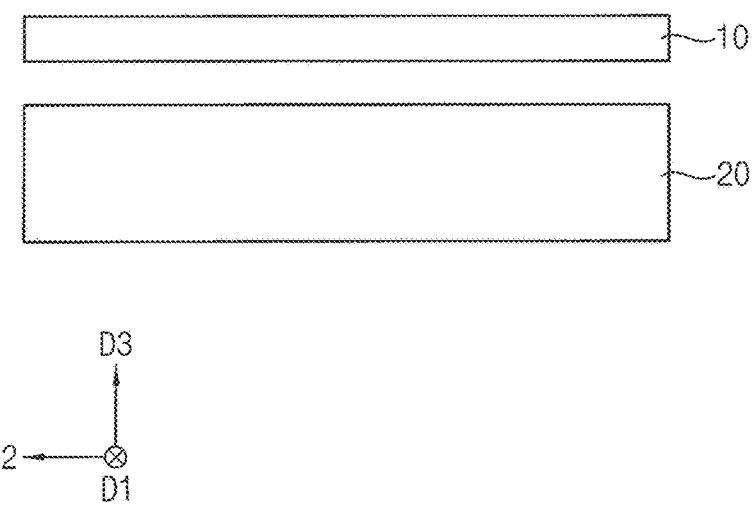
FIG. 8 is a cross-sectional diagram illustrating a display apparatus according to exemplary embodiments.

Although not shown, an adhesive may be applied on a lower surface of the base film 100, so that the base film 100 may be attached onto a display panel (Refer to display panel 20 of FIG. 8). Alternatively, the first wedge layer 110 and the second wedge layer 130 may be disposed directly on the display panel without the base film 100 (for example, directly disposed on a thin film encapsulation layer of the display panel).

The first wedge layer 110 may be disposed on the base film 100. An upper surface of the first wedge layer 110 may have wedge-shaped prism patterns.

Each wedge-shaped prism pattern of the first wedge layer 110 may include an inclined surface 112 forming an inclination angle θ with respect to a plane defined by a first direction D1 and a second direction D2, and a vertical surface 114 connected to the inclined surface 112 and extending in a third direction D3 perpendicular to the first direction D1 and the second direction D2. Here, the second direction D2 is perpendicular to the first direction D1. In addition, the inclined surface 112 may have the inclination angle θ with respect to the second direction D2, the wedge-shaped prism patterns of the first wedge layer 110 may be arranged in the second direction D2, and each of the wedge-shaped prism patterns may extend in the first direction D1. A distance between two neighboring vertical surfaces 114 may be defined as a pitch of the prism patterns, and a length of the vertical surface 114 in the third direction D3 may be defined as a height of the prism pattern.

The first wedge layer 110 may include a material having a first refractive index.

The second wedge layer 130 may be disposed on the first wedge layer 110 to have a lower surface corresponding to the wedge-shaped prism pattern of the first wedge layer 110. The second wedge layer 130 may include a material having a second refractive index greater than the first refractive index.

The light blocking pattern 120 may be disposed between the first wedge layer 110 and the second wedge layer 130 and on the vertical surface 114 of the first wedge layer 110. The light blocking pattern 120 may include a material that blocks light. For example, the light blocking pattern 120 may include an organic light blocking material containing carbon black, or may include an inorganic light blocking material such as metal oxide.

A lower surface 124 of the light blocking pattern 120 that contacts with the inclined surface 112 may be an inclined surface to form an inclination angle θ with respect to the surface defined by the first and second directions D1 and D2 so as to be parallel with the inclined surface 112. In other words, a side surface 122 of the light blocking pattern 120 may contact with the vertical surface 114, and the lower surface 124 may contact with the inclined surface 112.

Accordingly, a plurality of the inclined surfaces 112 and vertical surfaces 114 may be disposed between the first wedge layer 110 and the second wedge layer 130, and the light blocking pattern 120 may be disposed on the vertical surface 114 and between the first wedge layer 110 and the second wedge layer 130.

An upper surface of the light blocking pattern 120 facing the lower surface 124 may be parallel to the plane defined by the first and second directions D1 and D2.

The first wedge layer 110 has a first refractive index, and the second wedge layer 130 has a second refractive index. A cut-off angle may be adjusted by appropriately changing the first and second refractive indices, the inclination angle θ, and the pitch and height of the wedge-shaped prism pattern. The cut-off angle refers to a maximum angle of light emitting from the optical sheet with respect to the third direction D3.

Table 1 below shows various examples of the pitch, second refractive index, first refractive index, height, and inclination angle when the cut-off angle is 30 degrees or 40 degrees.

TABLE 1

| Pitch (μm) | Second refractive index | First refractive index | Height (μm) | Inclination angle (θ) (°) | Cut-off angle (θc) (°) |
|---|---|---|---|---|---|
| 60 | 1.6 | 1.3 | 43.8 | 36.1 | 30 |
|  |  |  | 35.6 | 30.7 | 40 |
|  | 2 | 1.5 | 40.6 | 34.1 | 30 |
|  |  |  | 34.4 | 29.8 | 40 |

Figure 3:
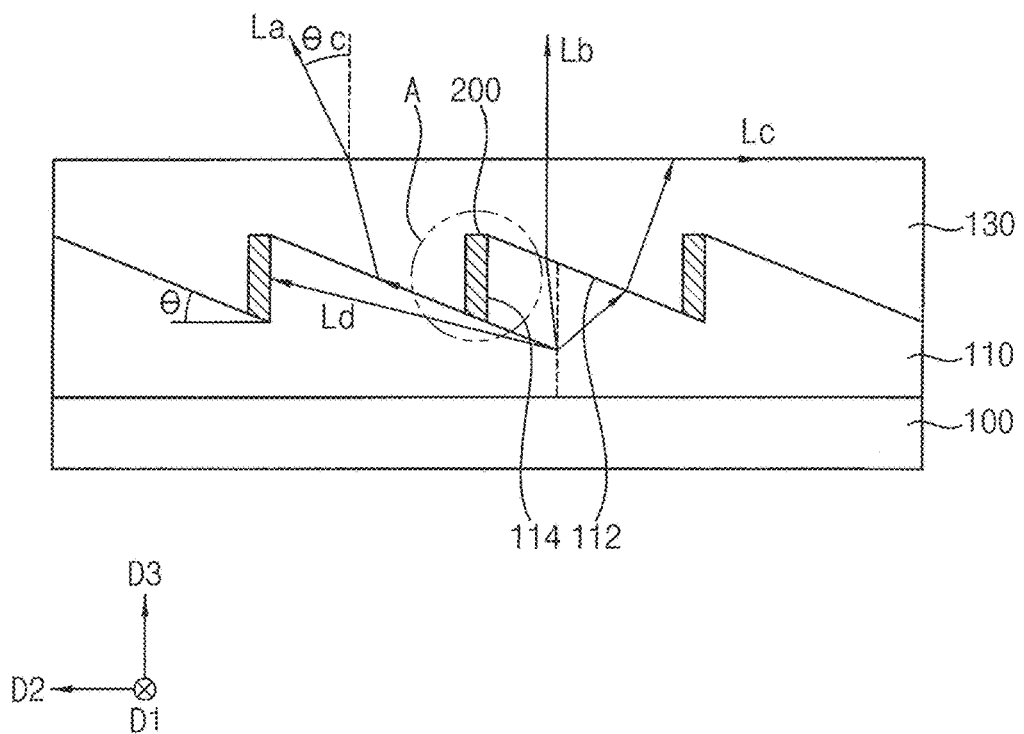
FIG. 3 is a cross-sectional diagram illustrating an optical sheet according to exemplary embodiments.
Figure 9:
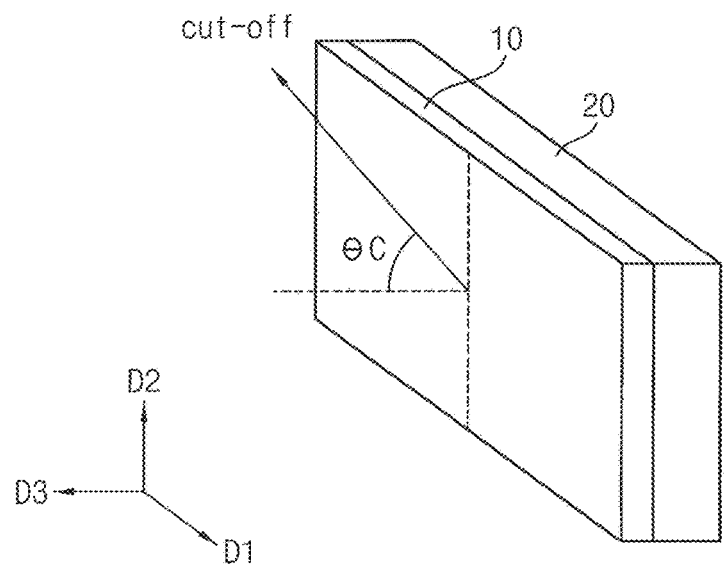
FIG. 9 is a perspective diagram illustrating a viewing angle of the display apparatus of FIG. 8.
Figure 10:
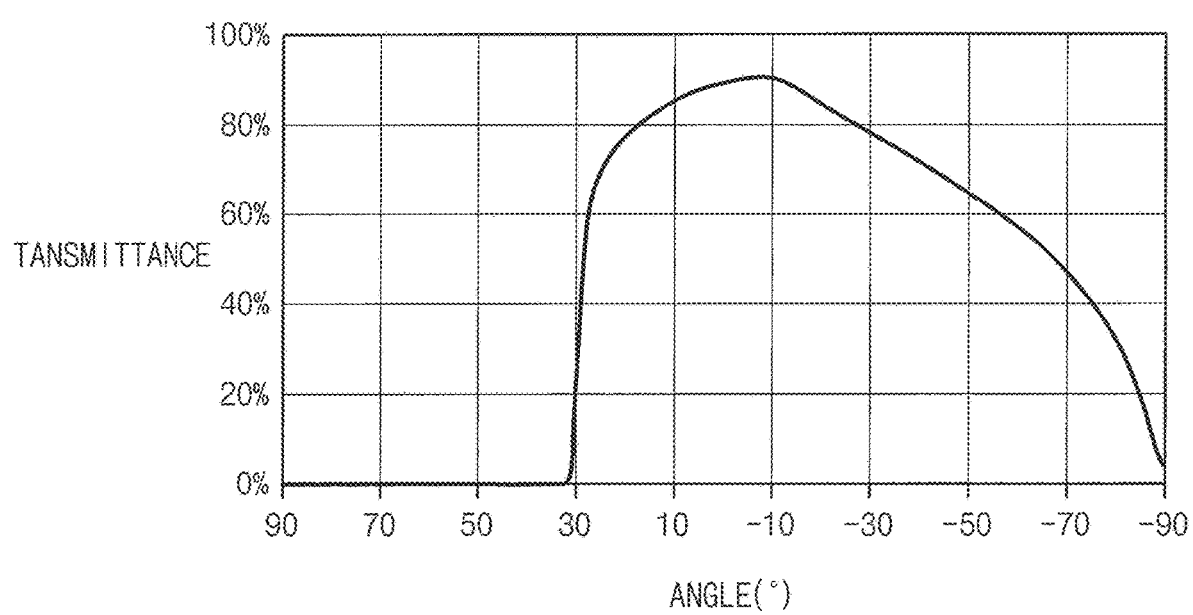
FIG. 10 is a graph illustrating transmittance of an optical sheet versus a viewing angle to show a cut-off angle of the display apparatus of FIG. 8.

In other words, the first wedge layer 110, the second wedge layer 130, and the light blocking pattern 120 may serve to adjust a path of the emission light, and may serve to block light emitted outside the optical sheet in a direction above the cut-off angle with respect to the third direction D3 (see FIGS. 3, 9 and 10). For example, as shown in FIG. 3, a light (e.g., La, Lb, and Lc) in the first wedge layer 110 at the inclination angle θ or more with respect to the surface defined by the first and second directions D1 and D2 may emit outside the optical sheet. However, a light (e.g., Ld) in the first wedge layer 110 at an angle less than the inclination angle θ may be blocked by the light blocking structure 200.

Figure 2:
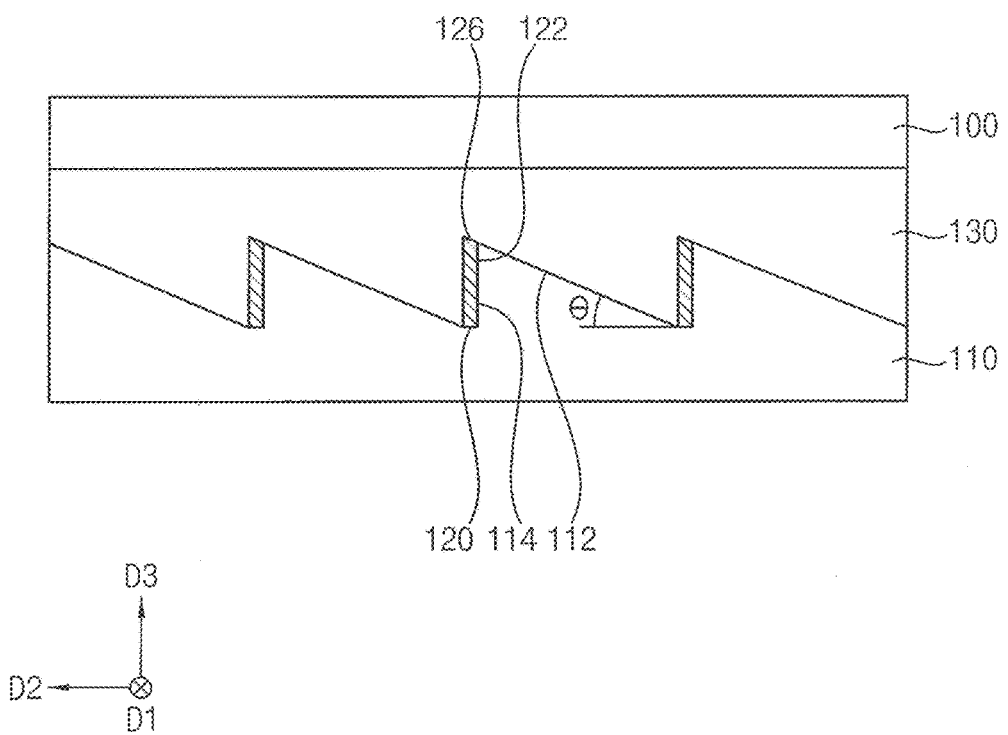
FIG. 2 is a cross-sectional diagram illustrating an optical sheet according to another exemplary embodiment.

FIG. 2 is a cross-sectional diagram illustrating an optical sheet according to another exemplary embodiment.

Referring to FIG. 2, the optical sheet is substantially the same as the optical sheet of FIG. 1 except that the base film 100 is disposed on the second wedge layer 130, and the upper surface 126 of the light blocking pattern 120 is inclined. Accordingly, duplicate descriptions will be simplified or omitted.

The optical sheet may include a first wedge layer 110, a second wedge layer 130, a light blocking pattern 120, and a base film 100.

An upper surface of the first wedge layer 110 may have wedge-shaped prism patterns. The first wedge layer 110 may include a material having a first refractive index.

Although not shown, an adhesive may be applied on a lower surface of the first wedge layer 110, so that the first wedge layer 110 may be attached onto the display panel 20 (see FIG. 8).

The second wedge layer 130 may be disposed on the first wedge layer 110 to have a lower surface corresponding to the wedge-shaped prism pattern of the first wedge layer 110. The second wedge layer 130 may include a material having a second refractive index greater than the first refractive index. The second wedge layer 130 may include an inclined surface 112 forming an inclination angle θ with respect to a plane defined by a first direction D1 and a second direction D2, and a vertical surface 114 connected to the inclined surface 112 and extending in a third direction D3 perpendicular to the first direction D1 and the second direction D2.

The light blocking pattern 120 may be disposed between the first wedge layer 110 and the second wedge layer 130 and on the vertical surface 114 of the first wedge layer 110.

An upper surface 126 of the light blocking pattern 120 that contacts with the inclined surface 112 of the second wedge layer 130 may be an inclined surface to form an inclination angle θ with respect to the surface defined by the first and second directions D1 and D2 so as to be parallel with the inclined surface 112. In other words, a side surface 122 of the light blocking pattern 120 may contact with the vertical surface 114, and the upper surface 126 may contact with the inclined surface 112.

A lower surface facing the upper surface 126 of the light blocking pattern 120 may be parallel to the plane defined by the first and second directions D1 and D2.

According to the exemplary embodiment, although the optical sheet has been described as including the base film 100 that contacts with the second wedge layer 130, the invention is not limited thereto. In another exemplary embodiment, for example, a lower base film disposed on the lower surface of the first wedge layer 110 may be further included like the optical sheet of FIG. 1. In this case, an adhesive layer on the lower base film may be attached to the display panel.

Figure 4:
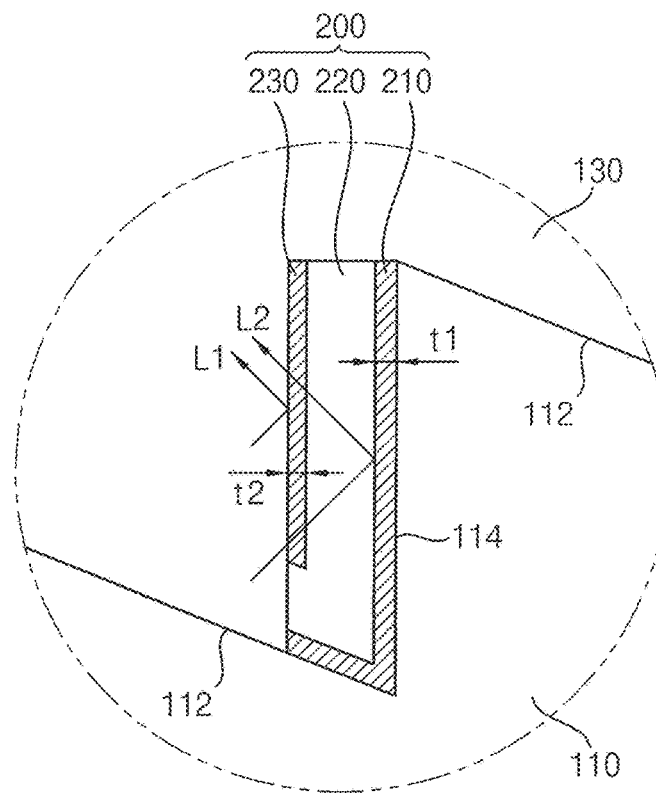
FIG. 4 is an enlarged cross-sectional diagram of portion A of FIG. 3.

FIG. 3 is a cross-sectional diagram illustrating an optical sheet according to exemplary embodiments, and FIG. 4 is an enlarged cross-sectional diagram of a portion A of FIG. 3.

Referring to FIGS. 3 and 4, the optical sheet may be substantially the same as the optical sheet of FIG. 1 except for the light blocking structure 200. Therefore, duplicate descriptions will be simplified or omitted.

The optical sheet may include a base film 100, a first wedge layer 110, a second wedge layer 130 and a light blocking structure 200.

The base film 100 may include a transparent insulating material.

The first wedge layer 110 may be disposed on the base film 100. An upper surface of the first wedge layer 110 may have wedge-shaped prism patterns. Each wedge-shaped prism pattern of the first wedge layer 110 may include an inclined surface 112 forming an inclination angle θ with respect to the plane defined by a first direction D1 and a second direction D2, and a vertical surface 114 connected to the inclined surface 112 and extending in a third direction D3 perpendicular to the first direction D1 and the second direction D2. The first wedge layer 110 may include a material having a first refractive index.

The second wedge layer 130 may be disposed on the first wedge layer 110 to have a lower surface corresponding to the wedge-shaped prism pattern of the first wedge layer 110. The second wedge layer 130 may include a material having a second refractive index greater than the first refractive index.

The light blocking structure 200 may include a plurality of thin films each having a thickness of about 1 micrometers (μm) or less.

The light blocking structure 200 may be disposed between the first wedge layer 110 and the second wedge layer 130 and on the vertical surface 114 of the first wedge layer 110. The light blocking structure 200 may include a first layer 210, a first insulating layer 220, and a second layer 230.

The first layer 210 may include a first portion disposed on the vertical surface 114 of the first wedge layer 110, and a second portion disposed on the inclined surface 112. The first layer 210 may have a first thickness t1 in the second direction D2. The first layer 210 may include a metal. For example, the first layer 210 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The second layer 230 may be disposed to be spaced apart from the first layer 210 so as to contact with the second wedge layer 130 while being parallel with the vertical surface 114. The second layer 230 may have a second thickness t2 in the second direction D2 smaller than the first thickness t1. The second layer 230 may include a metal. For example, the second layer 230 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The first insulating layer 220 may be disposed between the first layer 210 and the second layer 230. The first insulating layer 220 may be formed using or include a compound formed by mixing any one or at least two selected from the group consisting of SiO2, TiO2, ZrO2, Ta2O5, HfO2, Al2O3, ZnO, Y2O3, BeO, MgO, PbO2, WO3, VOX, SiNX, eNX, ZnS, CdS, SiC, SiCN, MgF, CaF2, NaF, BaF2, PbF2, LiF, LaF3, GaP, and AlOx. However, the invention is not limited thereto.

The first layer 210 may be thicker than the second layer 230 such that the first layer 210 may not transmit light or at least may have a transmittance lower than a transmittance of the second layer 230. In addition, since the second layer 230 is thinner than the first layer 210, some light L2 may be transmitted through the second layer 230. Thicknesses of the first layer 210, the second layer 230, and the first insulating layer 220 in the second direction D2 may be set such that the light L2 transmitted through the second layer 230 and reflected by the first layer 210 may cause destructive interference with a light L1 reflected by the second layer 230. Accordingly, the reflected light L1 and L2 may be extinguished by the light blocking structure 200, and emission light having an angle greater than the cut-off angle θc may be blocked by the optical sheet by the prism pattern formed by the inclined surface 112.

Although not shown, an adhesive may be applied on a lower surface of the base film 100, so that the base film 100 may be attached onto a display panel (see the display panel 20 of FIG. 8).

Figure 5:
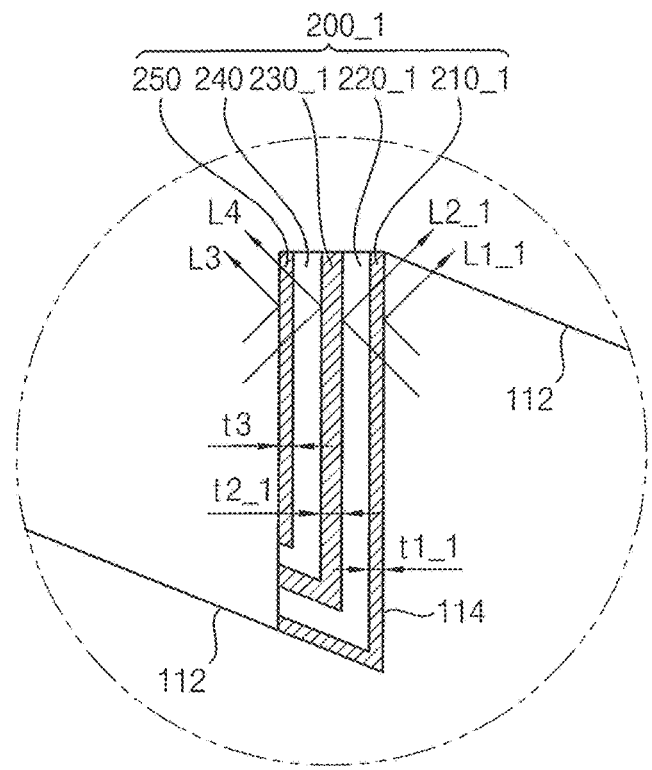
FIG. 5 is an enlarged cross-sectional diagram of portion A of FIG. 3 according to another exemplary embodiment.

FIG. 5 is an enlarged cross-sectional diagram of portion A of FIG. 3 according to another exemplary embodiment.

Referring to FIG. 5, the optical sheet may be substantially the same as the optical sheets of FIGS. 3 and 4 except for the light blocking structure. Therefore, duplicate descriptions will be simplified or omitted.

The optical sheet may include a base film 100, a first wedge layer 110, a second wedge layer 130 and a light blocking structure 200_1.

The base film 100 may include a transparent insulating material.

The first wedge layer 110 may be disposed on the base film 100. An upper surface of the first wedge layer 110 may have wedge-shaped prism patterns. Each wedge-shaped prism pattern of the first wedge layer 110 may include an inclined surface 112 forming an inclination angle θ with respect to the plane defined by the first direction D1 and the second direction D2, and a vertical surface 114 connected to the inclined surface 112 and extending in the third direction D3 perpendicular to the first direction D1 and the second direction D2. The first wedge layer 110 may include a material having a first refractive index.

The second wedge layer 130 may be disposed on the first wedge layer 110 to have a lower surface corresponding to the wedge-shaped prism pattern of the first wedge layer 110. The second wedge layer 130 may include a material having a second refractive index greater than the first refractive index.

The light blocking structure 200_1 may include a plurality of thin films each having a thickness of about 1 μm or less.

The light blocking structure 200_1 may be disposed between the first wedge layer 110 and the second wedge layer 130 and on the vertical surface 114 of the first wedge layer 110. The light blocking structure 200_1 may include a first layer 210_1, a first insulating layer 220_1, a second layer 230_1, a second insulating layer 240 and a third layer 250.

The first layer 210_1 may include a first portion disposed on the vertical surface 114 of the first wedge layer 110, and a second portion disposed on the inclined surface 112. The first layer 210_1 may have a first thickness t1_1 in the second direction D2. The first layer 210_1 may include a metal. For example, the first layer 210_1 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The second layer 230_1 may be spaced apart from the first layer 210_1, and include a first portion parallel to the vertical surface 114 and a second portion parallel to the inclined surface 112. The second layer 230_1 may have a second thickness t2_1 greater than the first thickness t1_1. The second layer 230_1 may include a metal. For example, the second layer 230_1 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The first insulating layer 220_1 may be disposed between the first layer 210_1 and the second layer 230_1. The first insulating layer 220_1 may be formed using or include a compound formed by mixing any one or at least two selected from the group consisting of SiO2, TiO2, ZrO2, Ta2O5, HfO2, Al2O3, ZnO, Y2O3, BeO, MgO, PbO2, WO3, VOX, SiNX, eNX, AlN, ZnS, CdS, SiC, SiCN, MgF, CaF2, NaF, BaF2, PbF2, LiF, LaF3, GaP, and AlOx. However, the invention is not limited thereto.

The third layer 250 may be disposed to be spaced apart from the second layer 230_1 so as to contact with the second wedge layer 130 while being parallel with the vertical surface 114. The third layer 250 may have a third thickness t3 smaller than the second thickness t2_1 in the second direction D2. The third layer 250 may include a metal. For example, the second layer 230_1 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The second insulating layer 240 may be disposed between the second layer 230_1 and the third layer 250. The second insulating layer 240 may be formed using or include a compound formed by mixing any one or at least two selected from the group consisting of SiO2, TiO2, ZrO2, Ta2O5, HfO2, Al2O3, ZnO, Y2O3, BeO, MgO, PbO2, WO3, VOX, SiNX, eNX, AlN, ZnS, CdS, SiC, SiCN, MgF, CaF2, NaF, BaF2, PbF2, LiF, LaF3, GaP, and AlOx. However, the invention is not limited thereto.

The second layer 230_1 may be thicker than each of the first layer 210_1 and the third layer 250 such that the second layer 230_1 may not transmit light or at least may have a transmittance lower than each of the transmittance of the first layer 210_1 and the transmittance of the third layer 250. In addition, since each of the third layer 250 and the first layer 210_1 is thinner than the second layer 230_1, some light L2_1 may be transmitted through the first layer 210_1 and some light L2_1, and some light L4 may be transmitted through the third layer 250. Thicknesses of the first layer 210_1, the second layer 230_1, the third layer 250, the first insulating layer 220_1, and the second insulating layer 240 in the second direction D2 may be set such that the light L2_1 transmitted through the first layer 210_1 and reflected by the second layer 230_1 may cause destructive interference with the light L1_1 reflected by the first layer 210_1, and the light L4 transmitted through the third layer 250 and reflected by the second layer 230_1 may cause destructive interference with the light L3 reflected by the third layer 250. Accordingly, the reflected lights L1_1 and L2_1 and the reflected lights L3 and L4 may be extinguished by the light blocking structure 200_1, and emission light having an angle greater than the cut-off angle (see cut-off angle θc of FIG. 3) may be blocked by the optical sheet by the prism pattern formed by the inclined surface 112.

Although FIG. 5 shows an example that the light blocking structure 200_1 has a flat upper side and an inclined lower side, this may vary depending on a sequence and a feature of a manufacturing process.

In addition, although FIG. 5 shows that the light blocking structure 200_1 has a five-layer structure, this is merely an example. In another exemplary embodiment, various laminated structures, such as a six-layer structure, or a seven-layer structure, may also be implemented.

Figure 6:
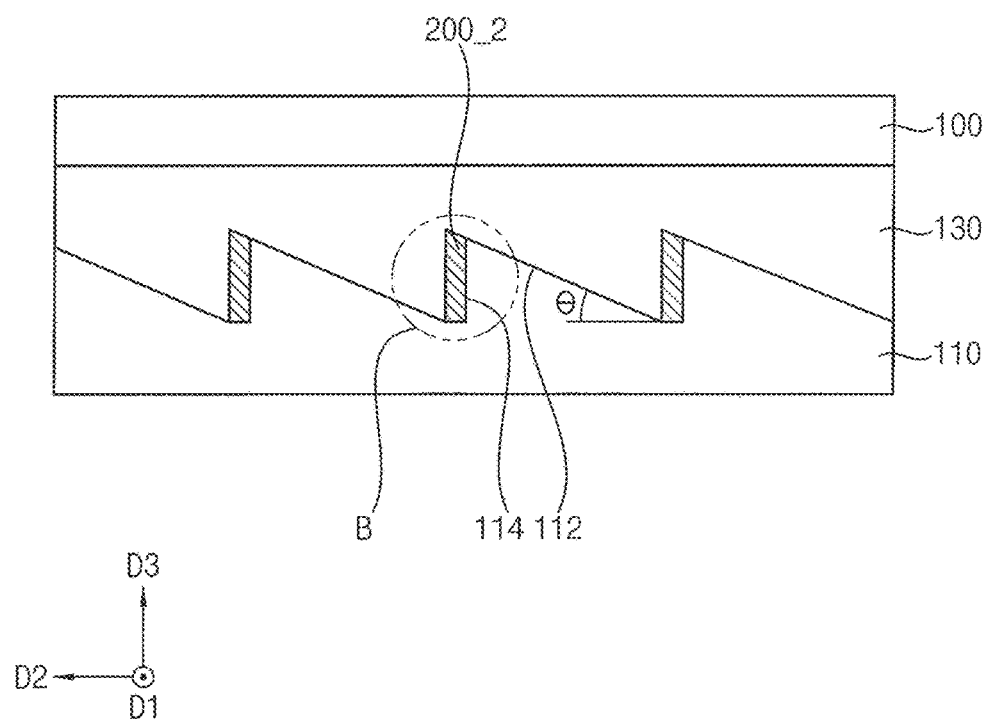
FIG. 6 is a cross-sectional diagram illustrating an optical sheet according to another exemplary embodiment.
Figure 7:
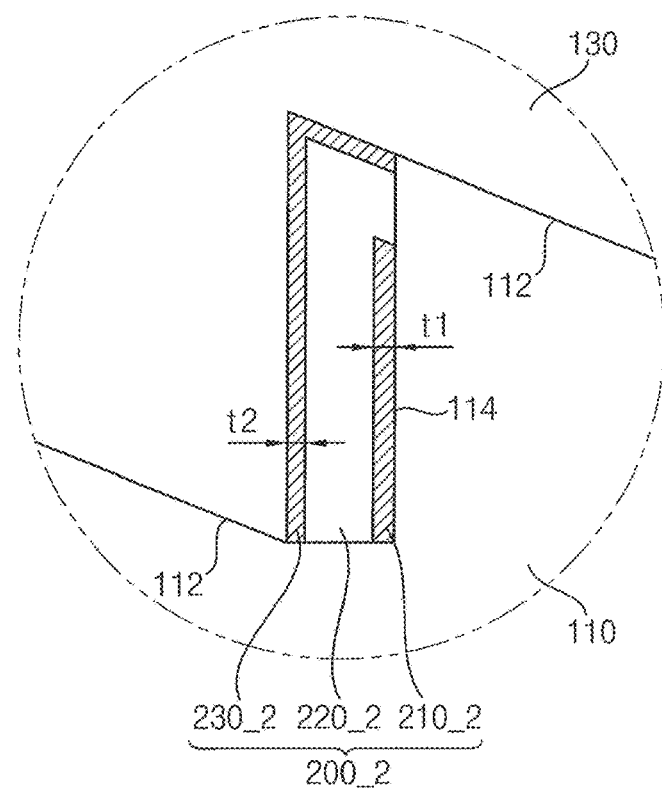
FIG. 7 is an enlarged cross-sectional diagram of portion B of FIG. 6.

FIG. 6 is a cross-sectional diagram illustrating an optical sheet according to another exemplary embodiment, and FIG. 7 is an enlarged cross-sectional diagram of portion B of FIG. 6.

Referring to FIGS. 6 and 7, the optical sheet may be substantially the same as the optical sheet of FIG. 2 except for the light blocking structure. Accordingly, duplicate descriptions will be simplified or omitted.

Referring to FIGS. 6 and 7, the optical sheet may include a first wedge layer 110, a second wedge layer 130, a light blocking structure 200_2 and a base film 100.

An upper surface of the first wedge layer 110 may have wedge-shaped prism patterns. The first wedge layer 110 may include a material having a first refractive index.

The second wedge layer 130 may be disposed on the first wedge layer 110 to have a lower surface corresponding to the wedge-shaped prism pattern of the first wedge layer 110.

The second wedge layer 130 may include a material having a second refractive index greater than the first refractive index. The second wedge layer 130 may include an inclined surface 112 forming an inclination angle θ with respect to the plane defined by the first direction D1 and the second direction D2, and a vertical surface 114 connected to the inclined surface 112 and extending in the third direction D3 perpendicular to the first direction D1 and the second direction D2. The base film 100 may be disposed on the second wedge layer 130.

The light blocking structure 200_2 may include a plurality of thin films each having a thickness of about 1 μm or less.

The light blocking structure 200_2 may be disposed between the first wedge layer 110 and the second wedge layer 130 and on the vertical surface 114 of the first wedge layer 110. The light blocking structure 200_2 may include a first layer 210_2, a first insulating layer 220_2, and a second layer 230_2.

The first layer 210_2 may be disposed on the vertical surface 114 of the first wedge layer 110. The first layer 210_2 may have a first thickness t1. The first layer 210_2 may include a metal. For example, the first layer 210_2 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The second layer 230_2 may be disposed to be spaced apart from the first layer 210_2, and include a first portion disposed on the second wedge layer 130 while being parallel with the vertical surface 114, and a second portion coinciding with the inclined surface 112. That is, the second portion is parallel to the inclined surface 112. The second layer 230_2 may have a second thickness t2 smaller than the first thickness t1. The second layer 230_2 may include a metal. For example, the second layer 230_2 may be formed using or include any one or at least two alloys selected from the group consisting of aluminum (Al), silver (Ag), magnesium (Mg), chromium (Cr), titanium (Ti), nickel (Ni), gold (Au), tantalum (Ta), copper (Cu), calcium (Ca), cobalt (Co), iron (Fe), molybdenum (Mo), tungsten (W), platinum (Pt), ytterbium (Yb), and manganese (Mn). However, the invention is not limited thereto.

The first insulating layer 220_2 may be disposed between the first layer 210_2 and the second layer 230_2. The first insulating layer 220_2 may be formed using or include a compound formed by mixing any one or at least two selected from the group consisting of $SiO_2$, $TiO_2$, $ZrO_2$, $Ta_2O_5$, $HfO_2$, $Al_2O_3$, ZnO, $Y_2O_3$, BeO, MgO, $PbO_2$, $WO_3$, VOX, SiNX, eNX, AlN, ZnS, CdS, SiC, SiCN, MgF, $CaF_2$, NaF, $BaF_2$, $PbF_2$, LiF, $LaF_3$, GaP, and AlOx. However, the invention is not limited thereto.

As in the description of FIG. 4, the light blocking structure 200_2 may cause the destructive interference, and the detailed description therefor will be omitted.

Although not shown, an adhesive may be applied on a lower surface of the first wedge layer 110, so that the first wedge layer 110 may be attached onto the display panel 20 (see display panel 20 of FIG. 8).

FIG. 8 is a cross-sectional diagram illustrating a display apparatus according to exemplary embodiments, and FIG. 9 is a perspective diagram illustrating a viewing angle of the display apparatus of FIG. 8.

Referring to FIGS. 8 and 9, the display apparatus may include an optical sheet 10 and a display panel 20. The optical sheet 10 may be attached onto a front surface of the display panel 20 as shown in FIG. 8. For example, the optical sheet 10 may be the optical sheet described in FIGS. 1 to 7.

The display panel 20 may display an image. For example, the display panel 20 may include an organic light emitting display panel, a liquid crystal display panel, or the like. The display panel 20 may emit light in a third direction D3 perpendicular to the first and second directions D1 and D2.

The optical sheet 10 may be disposed on the front surface of the display panel 20, and may block light emitted in an inclined direction at an angle greater than or equal to a cut-off angle θc inclined toward the second direction D2 from the third direction D3. Accordingly, the light emitted from the display panel 20 at an angle greater than or equal to the cut-off angle θc may not be recognized by a user when viewed from an upper side of the display apparatus (i.e., viewed to a direction opposite to the third direction D3).

FIG. 10 is a graph illustrating transmittance of an optical sheet versus a viewing angle to show a cut-off angle of the display apparatus of FIG. 8.

Referring to FIGS. 8 to 10, the transmittance of the optical sheet 10 of the display apparatus shows that the emissions of light at an angle of about 31 degrees or more in the second direction D2 with respect to the third direction D3 are blocked. Accordingly, the display apparatus configured to limit the light emission at the cut-off angle or more can be obtained.

In addition, since the optical sheet 10 has the light blocking pattern formed on the vertical surface, the aperture ratio of the display apparatus in the third direction D3 may be high as a whole. Accordingly, high luminance may be obtained while blocking light at the cut-off angle or more according to the invention.

Figure 11A:
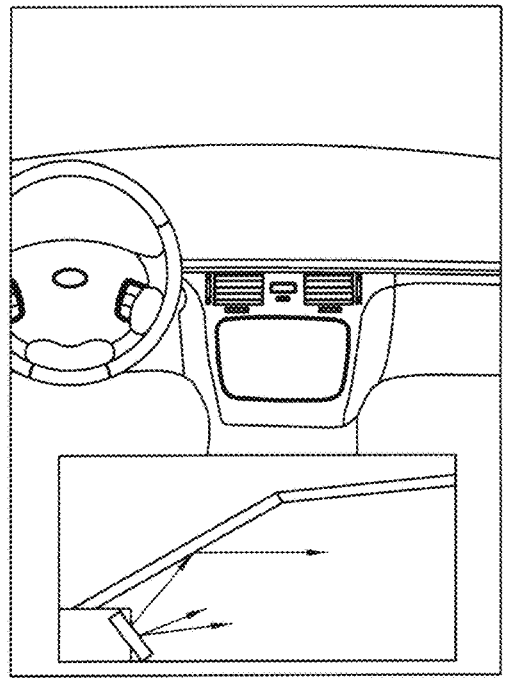
FIG. 11A is a diagram illustrating an example in which a display apparatus in the related art is applied to a center fascia monitor for a vehicle.

FIG. 11A is a diagram illustrating an example in which a display apparatus in the related art is applied to a center fascia monitor for a vehicle.

Referring to FIG. 11A, during driving at night, a light emitted from the display apparatus may be reflected on a front glass (i.e., windshield) of car and interrupt a field of vision of a driver. When a conventional viewing angle control sheet, which has a louver structure having the high aspect ratio, is used to prevent this phenomenon, a loss of luminance may occur, and thus the luminance of the display apparatus may be lowered, and the display quality may be deteriorated.

Figure 11B:
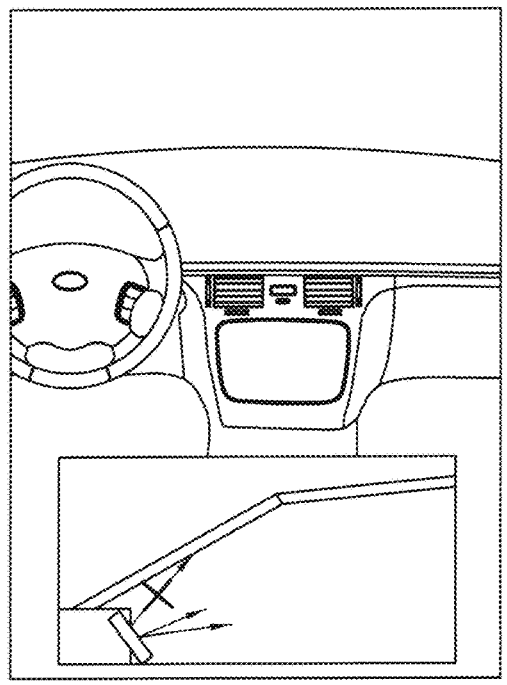
FIG. 11B is a diagram illustrating an example in which a display apparatus according to exemplary embodiments is applied to a center fascia monitor for a vehicle.

FIG. 11B is a diagram illustrating an example in which a display apparatus according to exemplary embodiments is applied to a center fascia monitor for a vehicle.

Referring to FIG. 11B, the display apparatus limits the light emission at the cut-off angle or more (i.e., limiting the light emitted toward the front glass), thereby preventing the light emitted from the display apparatus from being reflected on the front glass of the car, so that the driver's view for the front glass may be secured during driving at night.

In addition, since the optical sheet of the display apparatus has the light blocking pattern formed on the vertical surface, the aperture ratio may be high as a whole, and high luminance may be obtained while limiting light at the cut-off angle or more through the refraction of the light emitted from the inclined surface formed by the first wedge layer and the second wedge layer. The light blocking pattern may prevent a formation of a double image by blocking a light path proceeding to the vertical surface while blocking light at the cut-off angle or more.

In addition, as described above, the cut-off angle can be adjusted to a desired degree by adjusting the refractive index, the inclination angle of the inclined surface, the pitch and the height of the first wedge layer and the second wedge layer of the optical sheet.

Figure 12:
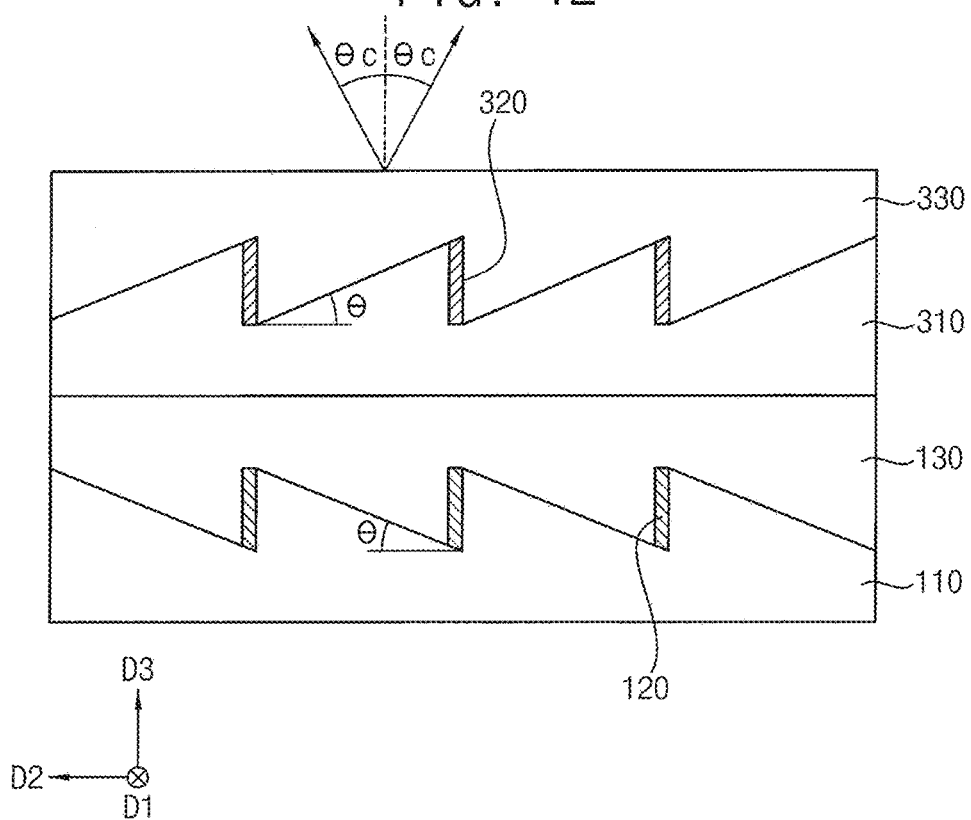
FIG. 12 is a cross-sectional diagram illustrating an optical sheet according to exemplary embodiments.

FIG. 12 is a cross-sectional diagram illustrating an optical sheet according to exemplary embodiments.

Referring to FIG. 12, the optical sheet may include a first wedge layer 110, a second wedge layer 130, a first light blocking pattern 120, a third wedge layer 310, a fourth wedge layer 330, and a second light blocking pattern 320.

The first wedge layer 110 may have a first refractive index and include a wedge-shaped prism pattern including a first inclined surface having a first inclination angle $\theta$ with respect to the second direction D2, and a first vertical surface extending in a third direction D3 perpendicular to the first direction D1 and the second direction D2.

The second wedge layer 130 may be disposed on the first wedge layer 110, and may have a second refractive index greater than the first refractive index.

The first light blocking pattern 120 may be disposed between the first wedge layer 110 and the second wedge layer 130, and may include a first surface that contacts with the first vertical surface of the first wedge layer 110, and a second surface inclined to form an inclination angle with respect to the plane defined by the first direction D1 and the second direction D2 while contacting with the first inclined surface.

The third wedge layer 310 may be disposed on the second wedge layer 130. The third wedge layer 310 may have a third refractive index and include a wedge-shaped prism pattern including a second inclined surface having a second inclination angle $\theta'$ inclined in a direction different from the inclination angle of the first wedge layer 110 with respect to the plane (e.g., the second inclination angle inclined with respect to a direction opposite to the second direction D2 as shown in FIG. 12), and a second vertical surface extending in the third direction D3. In this case, the first inclination angle $\theta$ and the second inclination angle $\theta'$ may have the same magnitude. Accordingly, the same cut-off angle $\theta c$ with respect to the third direction D3 may be implemented in both left and right sides as shown in FIG. 12.

The fourth wedge layer 330 may be disposed on the third wedge layer 310, and may have a fourth refractive index greater than the third refractive index.

The second light blocking pattern 320 may be disposed between the third wedge layer 310 and the fourth wedge layer 330, and include a first surface that contacts with the second vertical surface of the third wedge layer 310, and a second surface inclined to form an inclination angle with respect to the plane defined by the first direction D1 and the second direction D2 while contacting with the second inclined surface.

The optical sheet may be manufactured by forming the first wedge layer 110 and the second wedge layer 130, forming the third wedge layer 310 and the fourth wedge layer 330, and then combining the above two formed layers.

The exemplary embodiment above provides the optical sheet configured to limit the emitted light inclined to the left and right directions (i.e., second direction D2 and the opposite direction thereof) as shown in FIG. 12 by laminating the two sheets (110 and 130 are formed into one sheet and 310 and 330 are formed into one sheet) each including the light blocking pattern. However, the invention is not limited thereto. In another exemplary embodiment, emission angles in various directions may be limited by using several sheets.

One of the upper surface and the lower surface of each of the first light blocking pattern 120 and the second light blocking pattern 320 may be flat and the other is inclined, according to the method of manufacturing the optical sheet. FIG. 12 shows that the first light blocking pattern 120 has an inclined lower surface and a flat upper surface, and the second light blocking pattern 320 has a flat lower surface and an inclined upper surface. However, the invention is not limited thereto.

Although not shown, an adhesive may be applied on a lower surface of the first wedge layer 110, so that the first wedge layer 110 may be attached onto the display panel 20 (see display panel 20 of FIG. 8).

Figure 13:
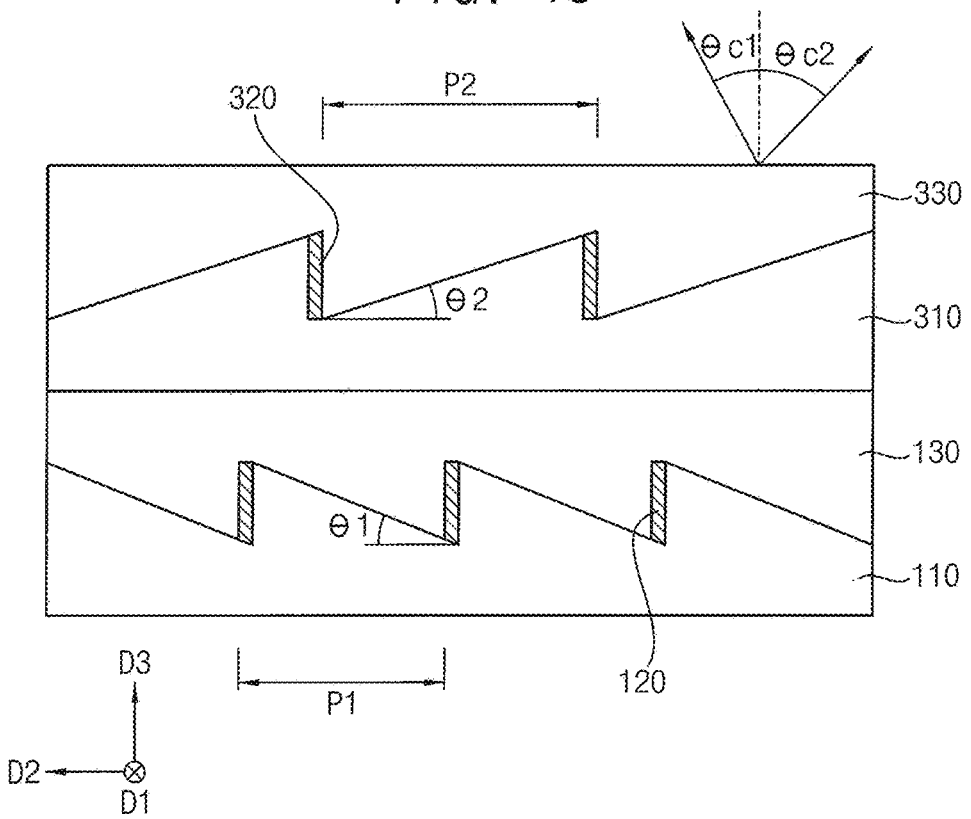
FIG. 13 is a cross-sectional diagram illustrating an optical sheet according to another exemplary embodiment.

FIG. 13 is a cross-sectional diagram illustrating an optical sheet according to another exemplary embodiment.

Referring to FIG. 13, the optical sheet is substantially the same as the optical sheet of FIG. 12 except that a first pitch P1 of the prism patterns of the first wedge layer 110 and a second pitch P2 of the prism patterns of the third wedge layer 310 are different from each other, and a first inclination angle θ1 of the prism patterns of the first wedge layer 110 and a second inclination angle θ2 of the prism patterns of the third wedge layer 310 are different from each other. Therefore, a first cut-off angle θc1 and a second cut-off angle θc2 are different from each other. Duplicate descriptions will be omitted.

Figure 14A:
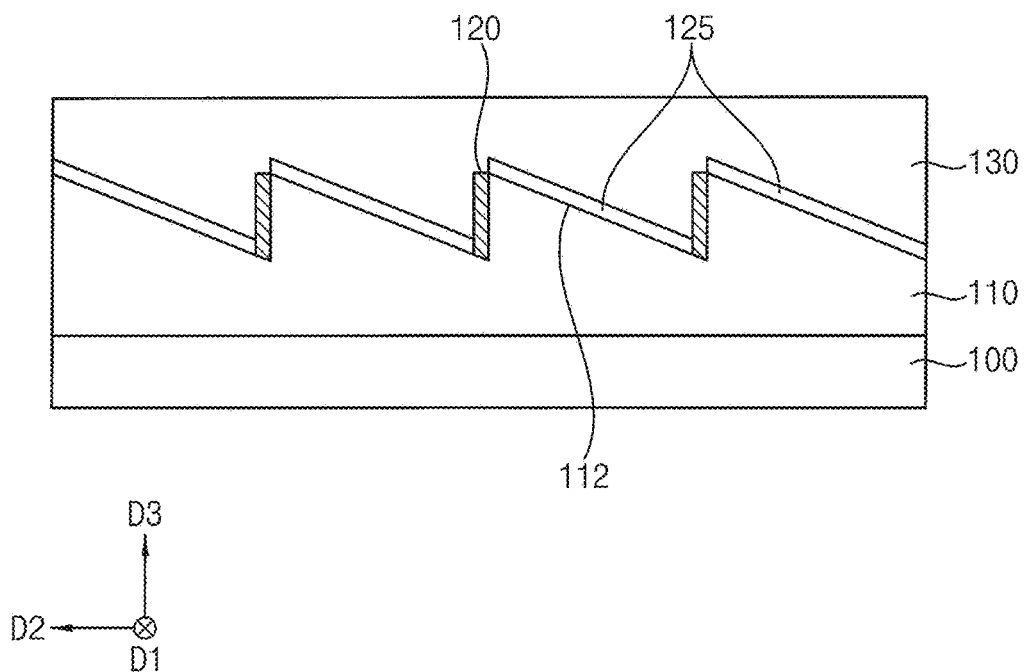
FIGS. 14A and 14B are cross-sectional diagrams illustrating an optical sheet added with an anti-reflection function according to exemplary embodiments.
Figure 14B:
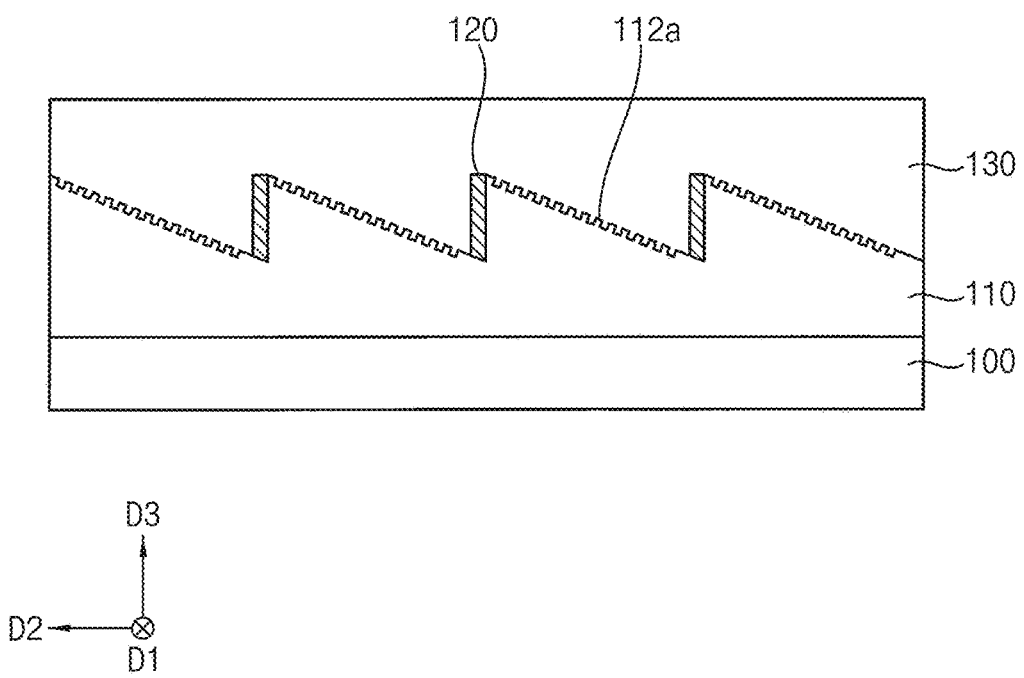

FIGS. 14A and 14B are cross-sectional diagrams illustrating an optical sheet added with an anti-reflection function according to exemplary embodiments. The optical sheet is substantially the same as the optical sheet of FIG. 1 except for an anti-reflection layer 125 and an uneven portion 112a (e.g., square wave pattern) for the anti-reflection function. Accordingly, duplicate descriptions will be omitted.

Referring to FIG. 14A, the optical sheet may further include the anti-reflection layer 125 disposed between the first wedge layer 110 and the second wedge layer 130 and on the inclined surface 112 of the first wedge layer 110.

The anti-reflection layer 125 may include various kinds of known anti-reflection films. For example, the anti-reflection layer 125 may have a structure in which a high refractive index layer and a low refractive index layer are sequentially laminated.

Referring to FIG. 14B, the optical sheet may have an uneven portion 112a defined by the inclined surface 112 of the first wedge layer 110. A light reflection at an interface between the first wedge layer 110 and the second wedge layer 130 may be reduced by the uneven portion 112a.

The exemplary embodiments above illustrate that the anti-reflection layer 125 or the uneven portion 112a is formed in order to improve the transmittance of the optical sheet. However, the invention is not limited thereto, and in another exemplary embodiment, the optical sheet may further include various anti-reflection structures.

FIGS. 15A to 15G are cross-sectional diagrams illustrating a method of manufacturing the optical sheet of FIG. 1.

Figure 15A:
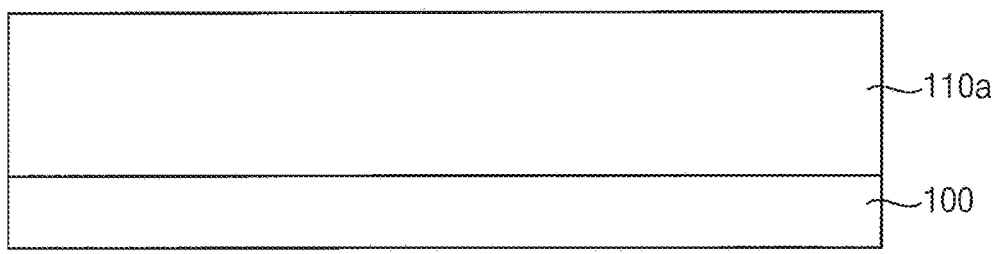
FIGS. 15A to 15G are cross-sectional diagrams illustrating a method of manufacturing the optical sheet of FIG. 1.

Referring to FIG. 15A, a resin layer 110a having the first refractive index may be formed on the base film 100.

Figure 15B:
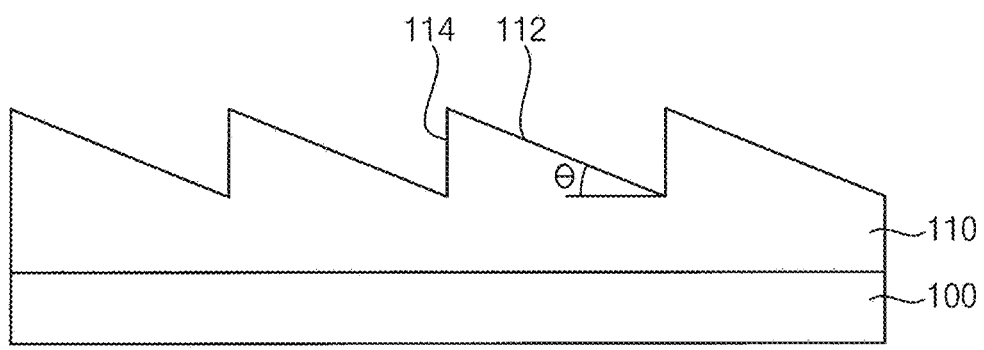

Referring to FIG. 15B, after an inclined surface 112 having an inclination angle θ with respect to a major surface (i.e., the plane defined by the first and second directions D1 and D2) of the base film 100 and a vertical surface 114 are formed on the resin layer 110a by using a mold or the like, the resin layer 110a may be cured. Accordingly, the first wedge layer 110, which includes a wedge-shaped prism pattern including the inclined surface and the vertical surface, may be formed.

Figure 15C:
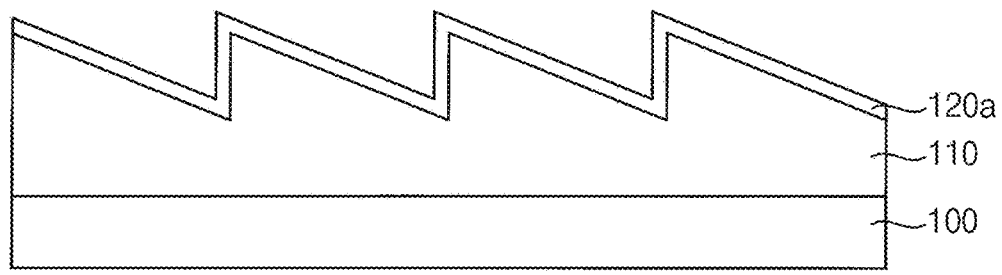

Referring to FIG. 15C, a light blocking layer 120a may be formed on the first wedge layer 110. The light blocking layer 120a may include a light blocking material, and may be formed on the inclined surface 112 and the vertical surface 114 of the first wedge layer 110. Since it is preferable that the light blocking layer 120a is uniformly formed on the inclined surface 112 and the vertical surface 114, a conformal deposition process may be used.

Figure 15D:
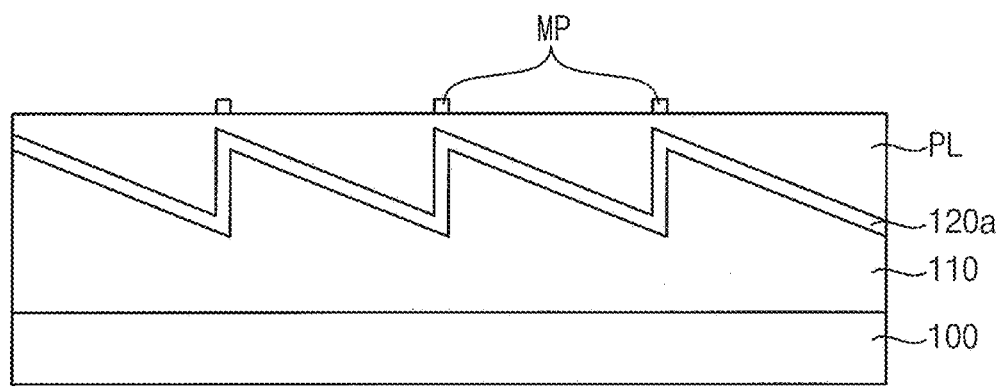

Referring to FIG. 15D, a planarization layer PL may be formed on the light blocking layer 120a, and a mask pattern MP may be formed on the planarization layer PL. An upper surface of the planarization layer PL may be planarized. The mask pattern MP may be formed by using various known schemes. For example, a photoresist layer may be formed on the planarization layer PL, exposed and developed so that the mask pattern MP may be formed.

Figure 15E:
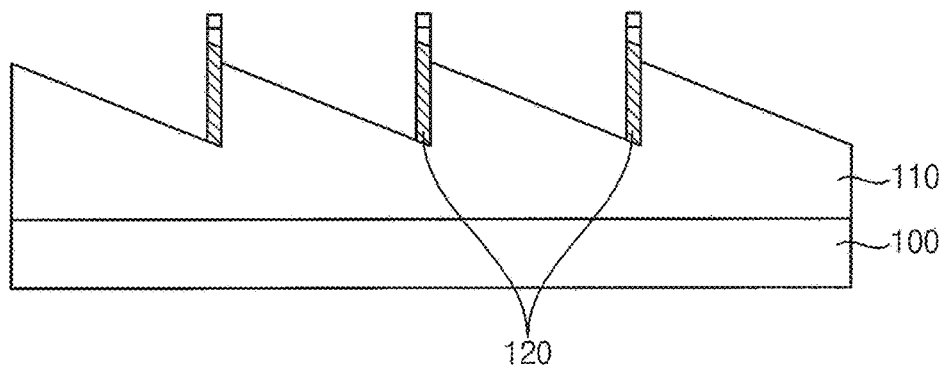

Referring to FIG. 15E, parts of the planarization layer PL and the light blocking layer 120a may be etched by using the mask pattern MP as an etching barrier. Accordingly, the inclined surface of the first wedge layer 110 may be exposed. Since a part of the light blocking layer 120a disposed under the mask pattern MP is required to remain without being removed, the light blocking layer 120a may be etched by using an anisotropic etching process.

Figure 15F:
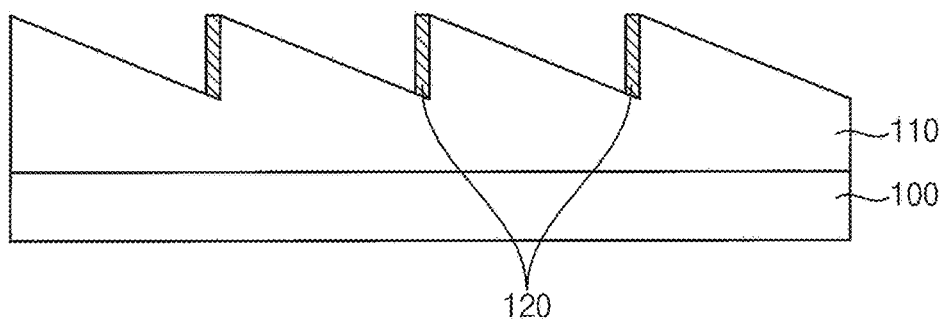

Referring to FIG. 15F, the light blocking pattern 120 may be formed by removing remaining parts of the mask pattern MP, the planarization layer PL, and the light blocking layer 120a. Accordingly, the light blocking pattern 120 may include a first surface that contacts with the vertical surface of the first wedge layer 110, and a second surface inclined to form an inclination angle with respect to the plane while contacting with the inclined surface of the first wedge layer 110.

Figure 15G:
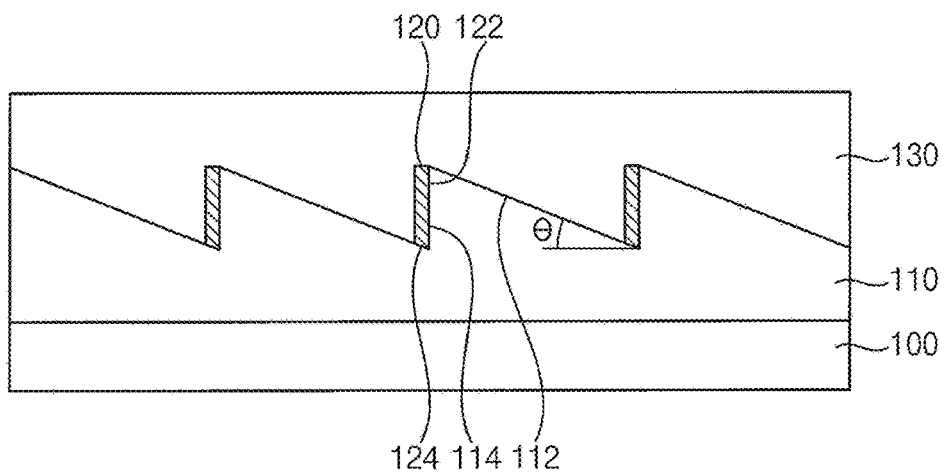

Referring to FIG. 15G, the second wedge layer 130 having a second refractive index greater than the first refractive index may be formed on the first wedge layer 110 on which the light blocking pattern 120 is formed. Therefore, the optical sheet may be manufactured.

FIGS. 16A to 16D are cross-sectional diagrams illustrating a method of manufacturing the optical sheets of FIGS. 3 and 4. The manufacturing method is substantially the same as the manufacturing methods of FIGS. 15A to 15G except for the formation of the light blocking structure 200. Accordingly, duplicate descriptions will be omitted.

Figure 16A:
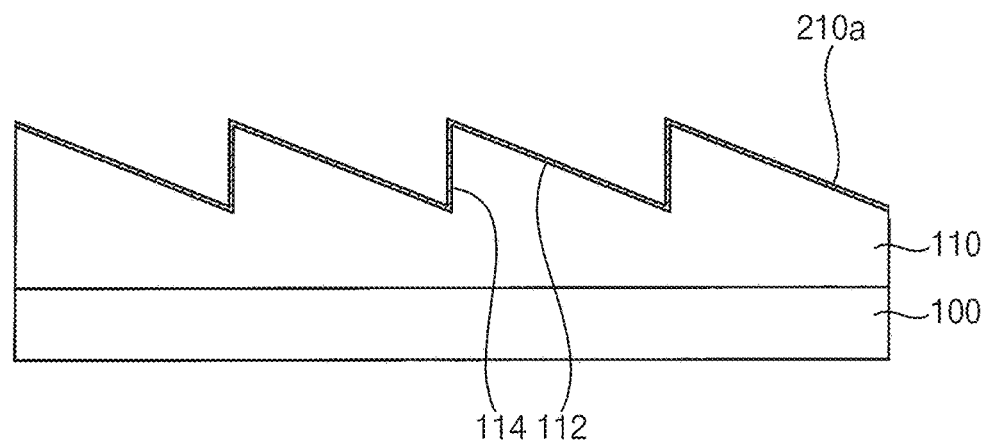
FIGS. 16A to 16D are cross-sectional diagrams illustrating a method of manufacturing the optical sheets of FIGS. 3 and 4.

Referring to FIG. 16A, the first wedge layer 110 having the first refractive index may be formed on the base film 100. The first wedge layer 110 may include a wedge-shaped prism pattern including an inclined surface 112 and a vertical surface 114.

A first raw layer 210a may be formed on the inclined surface 112 and the vertical surface 114 of the first wedge layer 110. Since it is preferable that the first raw layer 210a is uniformly formed on the inclined surface 112 and the vertical surface 114, a conformal deposition process may be used.

The first raw layer 210a may be formed using sputtering, chemical vapor deposition ("CVD"), physical vapor deposition ("PVD"), e-beam, thermal evaporation, thermal ion beam assisted deposition ("IBAD"), or the like, but the invention is not limited thereto.

Figure 16B:
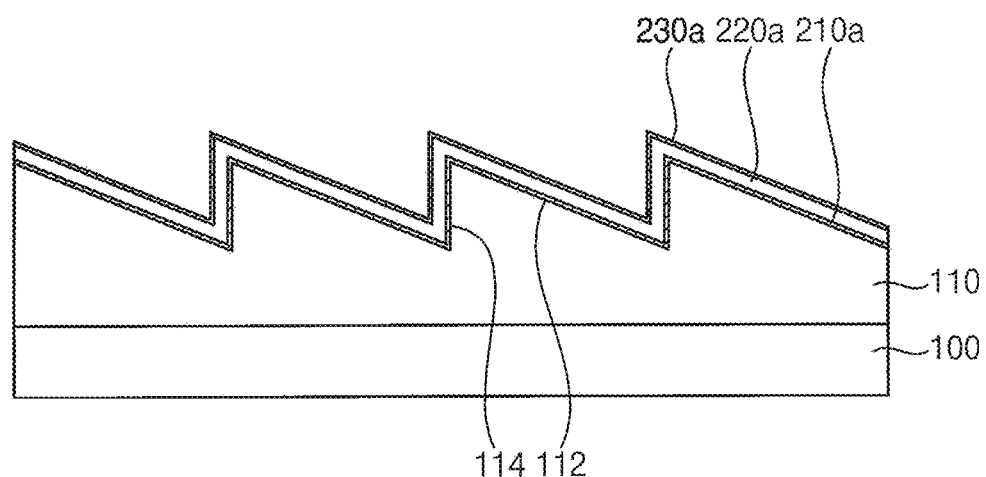

Referring to FIG. 16B, a first raw insulating layer 220a may be formed on the first raw layer 210a. The first raw insulating layer 220a may be formed using spin coating, spray coating, screen printing, inkjet, dispensing, or the like, but the invention is not limited thereto. In another exemplary embodiment, the first raw insulating layer 220a may be formed using sputtering, chemical vapor deposition (CVD), plasma chemical vapor deposition ("PECVD"), thermal evaporation, thermal ion beam assisted deposition (IBAD), atomic layer deposition ("ALD"), or the like.

A second raw layer 230a may be formed on the first raw insulating layer 220a. Since it is preferable that the second raw layer 230a is uniformly formed on the inclined surface 112 and the vertical surface 114, a conformal deposition process may be used.

The second raw layer 230a may be formed using sputtering, chemical vapor deposition (CVD), physical vapor deposition (PVD), e-beam, thermal evaporation, thermal ion beam assisted deposition (IBAD), or the like, but the invention is not limited thereto.

Figure 16C:
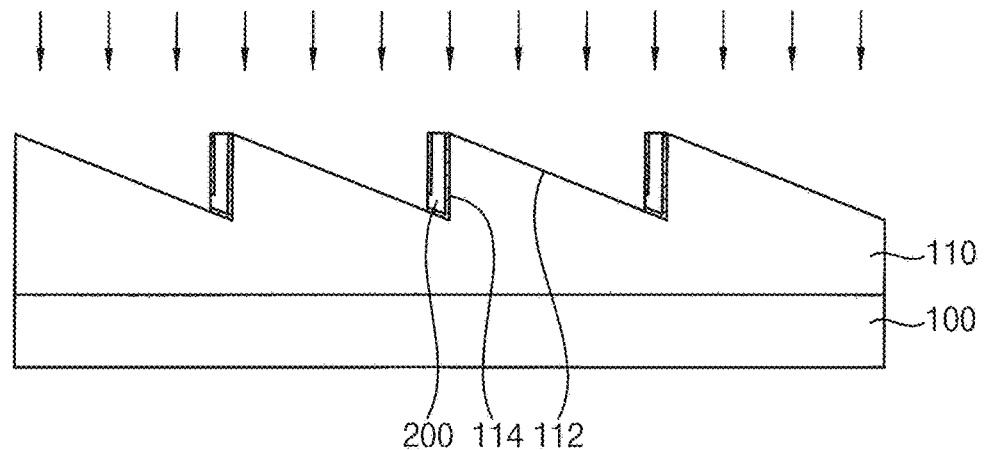
Figure 16D:
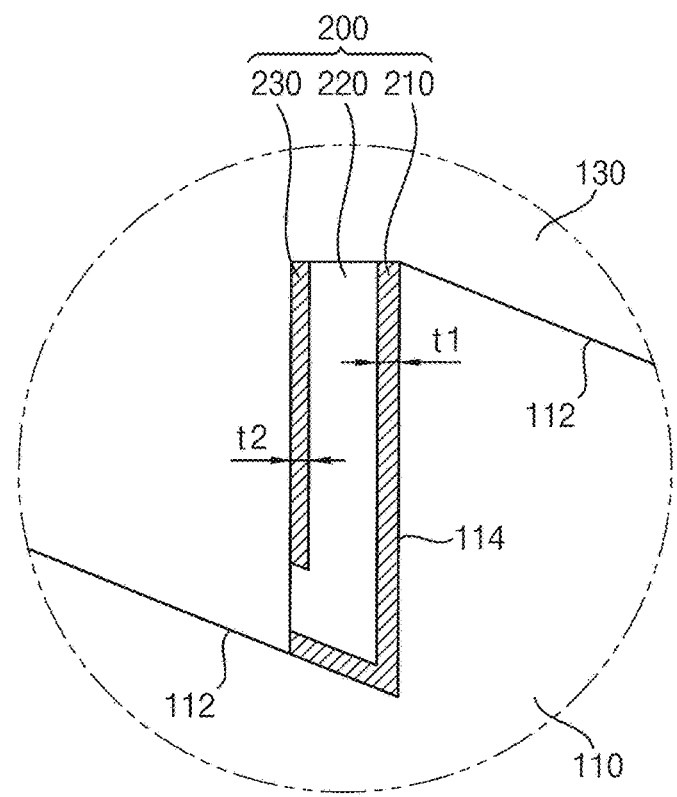

Referring to FIG. 16C, a light blocking structure 200 including a first layer, a first insulating layer, and a second layer (see first layer 210, first insulating layer 220 and second layer 230 of FIG. 16D) may be formed by etching the second raw layer 230a, the first raw insulating layer 220a, and the first raw layer 210a. Since a part of the light blocking structure 200 is required to remain without being removed, the second raw layer 230a, the first raw insulating layer 220a, and the first raw layer 210a may be etched by using an anisotropic etching process.

Referring to FIG. 16D, the second wedge layer 130 having a second refractive index greater than the first refractive index may be formed on the first wedge layer 110 on which the light blocking structure 200 is formed. Therefore, the optical sheet may be manufactured.

FIGS. 17A to 17D are cross-sectional diagrams illustrating a method of manufacturing the optical sheet of FIG. 5.

The manufacturing method is substantially the same as the manufacturing methods of FIGS. 16A to 16D except that the light blocking structure 200_1 has three metal layers. Accordingly, duplicate descriptions will be omitted.

Figure 17A:
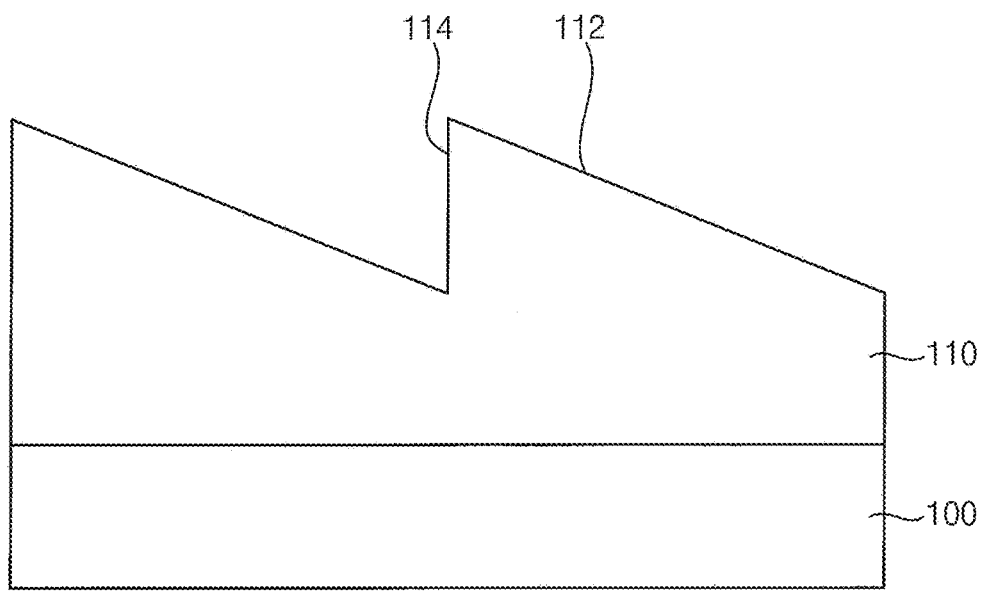
FIGS. 17A to 17D are cross-sectional diagrams illustrating a method of manufacturing the optical sheet of FIG. 5.

Referring to FIG. 17A, the first wedge layer 110 having the first refractive index may be formed on the base film 100. The first wedge layer 110 may include a wedge-shaped prism pattern including an inclined surface 112 and a vertical surface 114.

Figure 17B:
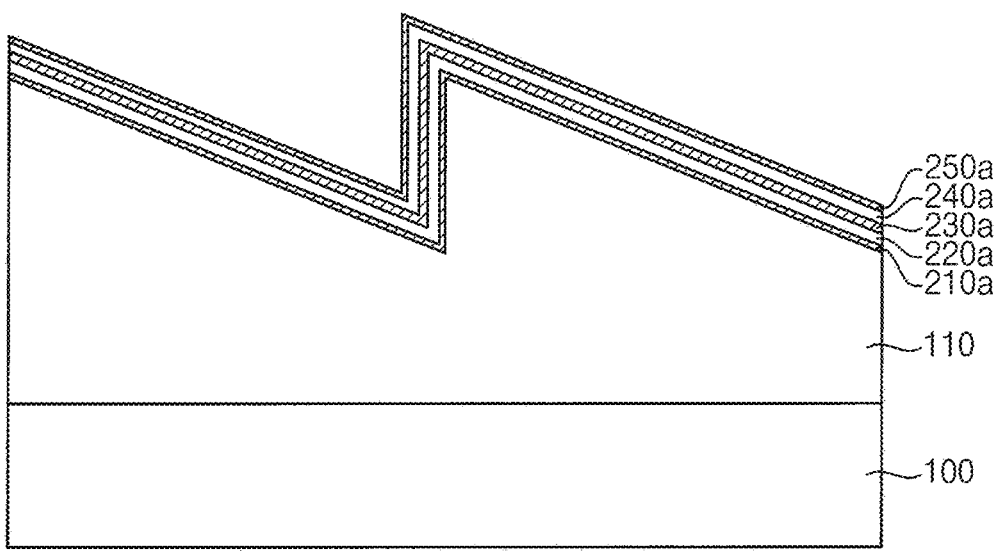

Referring to FIG. 17B, a first raw layer 210a, a first raw insulating layer 220a, a second raw layer 230a, a second raw insulating layer 240a, and a raw third layer 250a may be sequentially formed on the first wedge layer 110.

Figure 17C:
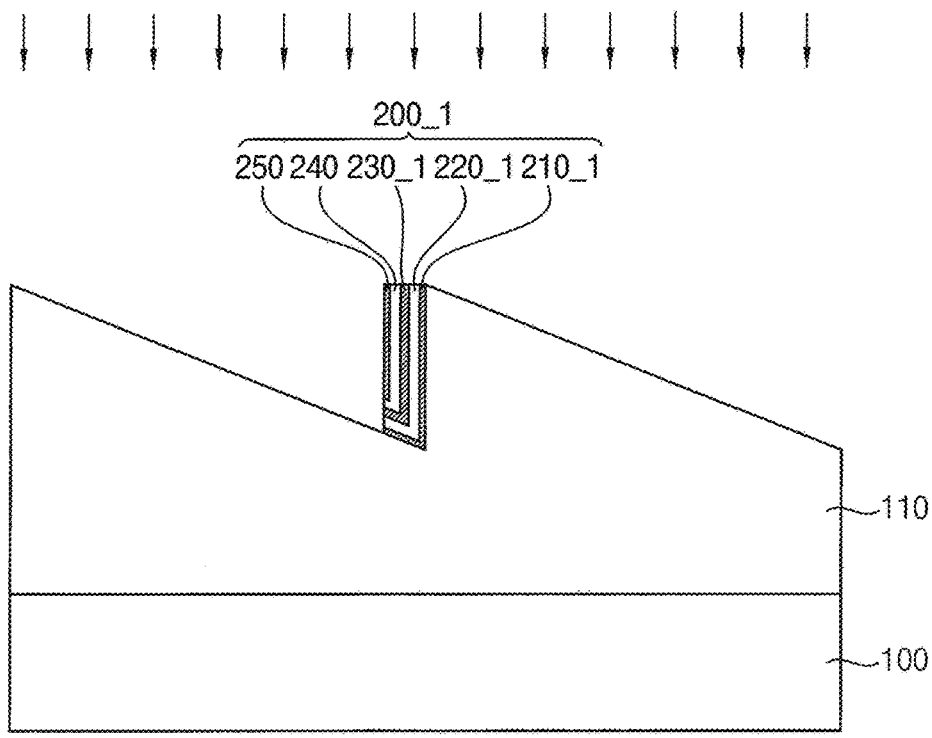

Referring to FIG. 17C, a light blocking structure 200_1, which includes a first layer 210_1, a first insulating layer 220_1, a second layer 230_1, a second insulating layer 240 and a third layer 250, may be formed by etching the raw third layer 250a, the second raw insulating layer 240a, the second raw layer 230a, the first raw insulating layer 220a, and the first raw layer 210a. Since a part of the light blocking structure 200_1 is required to remain without being removed, the raw third layer 250a, the second raw insulating layer 240a, the second raw layer 230a, the first raw insulating layer 220a, and the first raw layer 210a may be etched by using an anisotropic etching process.

Figure 17D:
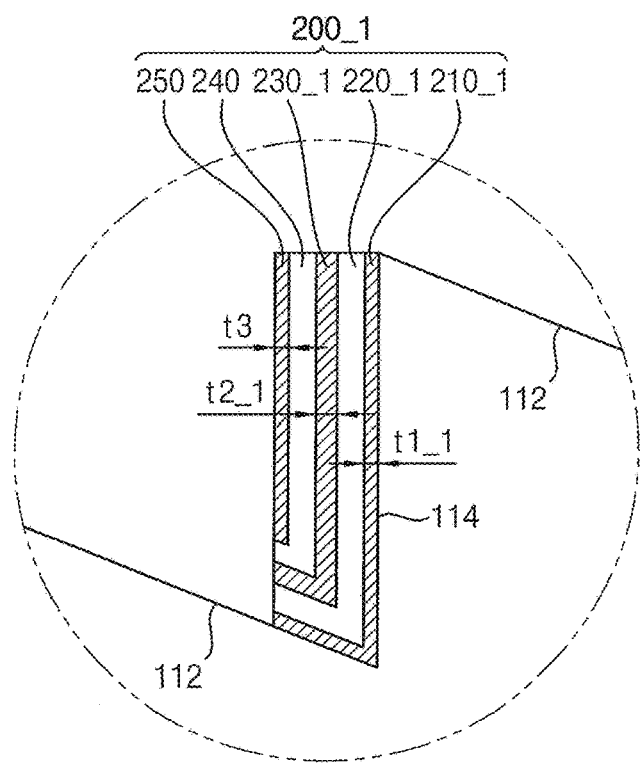

Referring to FIG. 17D, the second wedge layer 130 having a second refractive index greater than the first refractive index may be formed on the first wedge layer 110 on which the light blocking structure 200 is formed. Therefore, the optical sheet may be manufactured.

Figure 18:
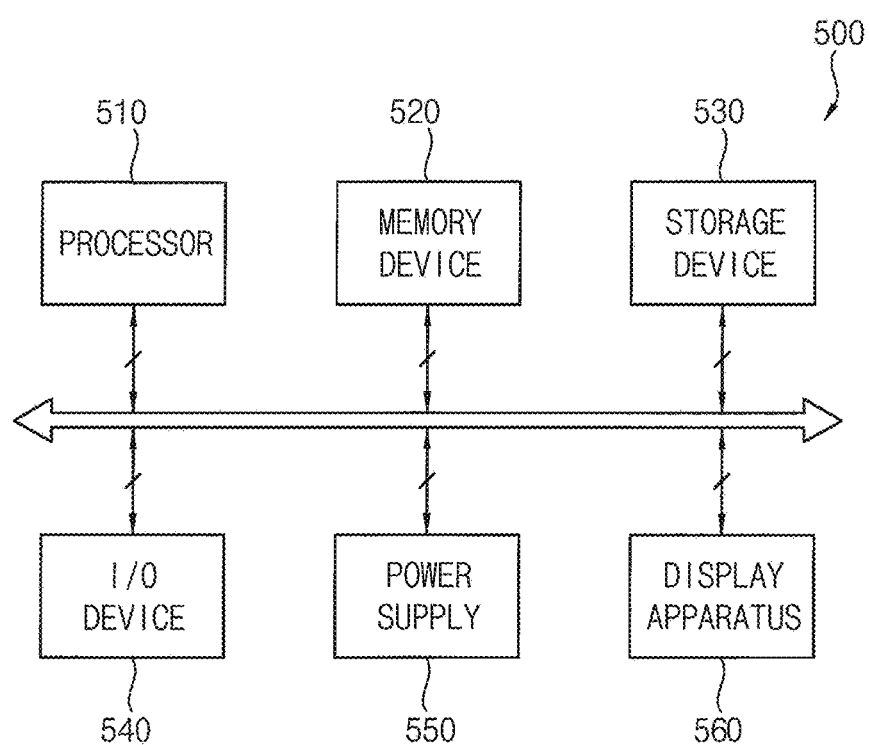
FIG. 18 is a block diagram illustrating an electronic apparatus according to exemplary embodiments.

FIG. 18 is a block diagram illustrating an electronic apparatus according to exemplary embodiments.

Referring to FIG. 18, the electronic apparatus 500 may include a processor 510, a memory device 520, a storage device 530, an input/output ("I/O") device 540, a power supply 550, and a display apparatus 560. Here, the display apparatus 560 may be the display apparatus of FIG. 1. In addition, the electronic apparatus 500 may further include a plurality of ports for communicating with a video card, a sound card, a memory card, a universal serial bus ("USB") device, other electronic apparatuses, etc. In an exemplary embodiment, the electronic apparatus 500 may be implemented as a display apparatus used for a vehicle (e.g., car) as described above. However, the electronic apparatus 500 according to the invention is not limited thereto. For example, the electronic apparatus 500 may be implemented as a cellular phone, a video phone, a smart pad, a smart watch, a tablet PC, a car navigation system, a computer monitor, a laptop, a head mounted display ("HMD") apparatus, etc.

The processor 510 may perform various computing functions. The processor 510 may be a microprocessor, a central processing unit ("CPU"), an application processor ("AP"), etc. The processor 510 may be coupled to other components via an address bus, a control bus, a data bus, etc. Further, the processor 510 may be coupled to an extended bus such as a peripheral component interconnection ("PCI") bus. The memory device 520 may store data for operations of the electronic apparatus 500. For example, the memory device 520 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc. The storage device 530 may include a solid-state drive ("SSD") device, a hard disk drive ("HDD") device, a CD-ROM device, etc. The I/O device 540 may include an input device such as a keyboard, a keypad, a mouse device, a touch-pad, a touch-screen, etc., and an output device such as a printer, a speaker, etc. The power supply 550 may provide power for operations of the electronic apparatus 500.

The display apparatus 560 may be coupled to other components via the buses or other communication links. In some exemplary embodiments, the I/O device 540 may include the display apparatus 560. As described above, since the display apparatus 560 includes the optical sheet including the first wedge layer, the light blocking pattern, and the second wedge layer, the display apparatus configured to limit the light emission at the cut-off angle or more can be obtained. In addition, since the optical sheet has the light blocking pattern formed on the vertical surface, the aperture ratio may be high as a whole. Accordingly, high luminance may be obtained while limiting light at the cut-off angle or more. Since these are described above, the duplicated description related thereto will not be repeated.

When the display apparatus is used as a display apparatus for a vehicle, a direction for limiting the light emission angle of the display panel may be an upward direction with respect to a direction perpendicular to the display panel (i.e., a direction perpendicular to a major plane of the display panel). Accordingly, the reflection of a light emitted from the display apparatus on the windshield of the vehicle can be reduced.

In addition, the direction for limiting the light emission angle may be additionally limited in left and right directions with respect to the direction perpendicular to the display panel. Accordingly, the problem that the light emitted from the display apparatus is reflected on both glasses of the vehicle and thus interrupts a field of vision of a driver from side mirrors can be reduced.

The present inventive concept may be applied to a display apparatus and an electronic apparatus including the display apparatus. For example, the present inventive concept may be applied to a smart phone, a cellular phone, a video phone, a smart pad, a smart watch, a tablet PC, a car navigation system, a television, a computer monitor, a laptop, a head mounted display apparatus, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An optical sheet comprising:
a first wedge layer having a first refractive index and including a wedge-shaped prism pattern including a first inclined surface having a first inclination angle with respect to a plane defined by a first direction and a second direction, and a first vertical surface extending in a third direction perpendicular to the plane, wherein the second direction is perpendicular to the first direction, and the first inclination angle is more than 0 degree (°) and less than 90 degrees (°);
a second wedge layer disposed on the first wedge layer and having a second refractive index greater than the first refractive index; and
a first light blocking pattern disposed between the first wedge layer and the second wedge layer and including a first surface that contacts with the first vertical surface and a second surface inclined to have the first inclination angle with respect to the plane while contacting with the first inclined surface.

2. The optical sheet of claim 1, further comprising:
a base film disposed on a lower surface of the first wedge layer or an upper surface of the second wedge layer.

3. The optical sheet of claim 2, wherein the second surface of the first light blocking pattern is a surface closest to the base film among surfaces of the first light blocking pattern.

4. The optical sheet of claim 1, wherein the first light blocking pattern includes:
a first layer parallel to the first vertical surface and including a metal;
a second layer parallel to the first layer, spaced apart from the first layer, and including a metal; and
a first insulating layer disposed between the first layer and the second layer.

5. The optical sheet of claim 4, wherein the first layer includes a first portion which contacts with the first vertical surface and a second portion which extends from the first vertical surface and contacts with the first inclined surface.

6. The optical sheet of claim 4, wherein the first layer has a first thickness, and the second layer has a second thickness thinner than the first thickness.

7. The optical sheet of claim 4, further comprising:
a third layer parallel to the second layer, spaced apart from the second layer, and including a metal; and
a second insulating layer disposed between the second layer and the third layer,
wherein the second layer is disposed between the first insulating layer and the second insulating layer.

8. The optical sheet of claim 1, wherein the first light blocking pattern includes a third surface facing the second surface, and the third surface is parallel to the plane defined by the first and second directions.

9. The optical sheet of claim 1, wherein the prism pattern of the first wedge layer extends in the first direction, the prism pattern is provided in plurality, and the plurality of prism patterns are arranged in the second direction.

10. The optical sheet of claim 1, further comprising:
a third wedge layer disposed on the second wedge layer, having a third refractive index, and including a wedge-shaped prism pattern including a second inclined surface having a second inclination angle inclined in a direction different from the first inclination angle with respect to the plane and a second vertical surface extending in the third direction;
a fourth wedge layer disposed on the third wedge layer and having a fourth refractive index greater than the third refractive index; and
a second light blocking pattern disposed between the third wedge layer and the fourth wedge layer and including a first surface that contacts with the second vertical surface and a second surface inclined to have the second inclination angle with respect to the plane while contacting with the second inclined surface.

11. The optical sheet of claim 10, wherein the prism pattern of the first wedge layer is provided in plurality, the plurality of prism patterns of the first wedge layer are arranged in one direction, and a distance between two adjacent first vertical surfaces is defined as a first pitch of the prism patterns of the first wedge layer;
wherein the prism pattern of the third wedge layer is provided in plurality, the plurality of prism patterns of the third wedge layer are arranged in one direction, and a distance between two adjacent second vertical surfaces is defined as a second pitch of the prism patterns of the third wedge layer, and
wherein the first pitch of the prism patterns of the first wedge layer and the second pitch of the prism patterns of the third wedge layer are different from each other.

12. The optical sheet of claim 1, further comprising:
an anti-reflection layer disposed on the first inclined surface.

13. The optical sheet of claim 1, wherein a square wave pattern is defined by the first inclined surface.

14. A method of manufacturing an optical sheet, the method comprising:
forming a first wedge layer on a base film, wherein the first wedge layer has a first refractive index and includes a wedge-shaped prism pattern including an inclined surface having an inclination angle with respect to a major surface plane defining the base film and a vertical surface extending in a direction perpendicular to the major surface plane of the base film;
forming a light blocking pattern on the vertical surface of the first wedge layer; and
forming a second wedge layer having a second refractive index on the first wedge layer on which the light blocking pattern is formed,
wherein the formed light blocking pattern includes a surface inclined to have the inclination angle with respect to the major surface plane defining the base film while contacting with the inclined surface of the prism pattern,
wherein the inclination angle is more than 0 degree (°) and less than 90 degrees (°).

15. The method of claim 14, wherein forming the first wedge layer includes:
forming a resin layer on the base film;
forming the prism pattern on the resin layer by using a mold; and
curing the resin layer.

16. The method of claim 14, wherein forming the light blocking pattern includes:
forming a first raw layer including a metal on the first wedge layer;
forming a first insulating layer on the first raw layer;
forming a second raw layer including a metal on the first insulating layer; and forming a light blocking pattern including a first layer, a first insulating layer, and a second layer by etching the second raw layer, the first raw insulating layer, and the first raw layer by using an anisotropic etching process.

17. The method of claim 16, wherein a thickness of the first layer is different from a thickness of the second layer.

18. A display apparatus comprising:
a display panel which displays an image; and
an optical sheet disposed on the display panel to limit a light emission angle of the display panel,
wherein the optical sheet includes:
a first wedge layer having a first refractive index and including a wedge-shaped prism pattern including an inclined surface having an inclination angle with respect to a major surface plane of the display panel and a vertical surface extending in a direction perpendicular to the major surface plane of the display panel;
a second wedge layer disposed on the first wedge layer and having a second refractive index greater than the first refractive index; and
a light blocking pattern disposed between the first wedge layer and the second wedge layer and including a first surface that contacts with the vertical surface and a second surface inclined to have the inclination angle with respect to the major surface plane of the display panel while contacting with the inclined surface,
wherein the first inclination angle is more than 0 degree (°) and less than 90 degrees (°).

19. The display apparatus of claim 18, wherein the display apparatus is a display apparatus for a vehicle, and a direction where a light emission angle of the display panel is limited is an upward direction with respect to a direction perpendicular to the major surface plane of the display panel.

20. The display apparatus of claim 19, wherein the direction where the light emission angle is limited further includes left and right directions with respect to the direction perpendicular to the major surface plane of the display panel.

* * * * *